(12) United States Patent
Dempsey

(10) Patent No.: US 8,140,258 B1
(45) Date of Patent: Mar. 20, 2012

(54) WAYFINDING SYSTEM

(75) Inventor: Michael Dempsey, Groton, MA (US)

(73) Assignee: The General Hospital Corporation, Boston, MA (US)

( * ) Notice: Subject to any disclaimer, the term of this patent is extended or adjusted under 35 U.S.C. 154(b) by 153 days.

(21) Appl. No.: 12/715,544

(22) Filed: Mar. 2, 2010

(51) Int. Cl.
*G01C 21/00* (2006.01)

(52) U.S. Cl. ........... 701/206; 701/3; 701/14; 701/23; 340/870.02; 340/990; 340/995.19; 340/961; 340/971; 342/357.31; 342/386; 434/112; 398/119; 473/407

(58) Field of Classification Search ........... 701/3, 14, 701/23, 200, 201, 202, 213, 206, 207, 209, 701/210, 211; 340/870.02, 990, 995.19, 340/961, 971; 342/357.31, 386; 344/112; 398/119; 250/214 AL; 473/404
See application file for complete search history.

(56) References Cited

U.S. PATENT DOCUMENTS

| | | | |
|---|---|---|---|
| 5,202,666 A | 4/1993 | Knippscheer | |
| 5,610,589 A | 3/1997 | Evans et al. | |
| 5,812,059 A | 9/1998 | Shaw et al. | |
| 5,952,924 A | 9/1999 | Evans et al. | |
| 6,236,317 B1 | 5/2001 | Cohen et al. | |
| 6,392,546 B1 | 5/2002 | Smith | |
| 6,426,701 B1 | 7/2002 | Levy et al. | |
| 6,574,482 B1 | 6/2003 | Radomsky et al. | |
| 6,727,818 B1 | 4/2004 | Wildman et al. | |
| 6,882,278 B2 | 4/2005 | Winings et al. | |
| 6,883,563 B2 | 4/2005 | Smith | |
| 6,956,498 B1 | 10/2005 | Gauthier et al. | |
| 6,975,231 B2 | 12/2005 | Lane et al. | |
| 6,977,579 B2 * | 12/2005 | Gilfix et al. | 340/407.1 |
| 7,015,816 B2 | 3/2006 | Wildman et al. | |
| 7,099,649 B2 | 8/2006 | Patterson et al. | |
| 7,099,895 B2 | 8/2006 | Dempsey | |
| 7,242,307 B1 | 7/2007 | LeBlond et al. | |
| 7,348,736 B2 * | 3/2008 | Piepgras et al. | 315/291 |
| 7,403,111 B2 | 7/2008 | Tessier et al. | |
| 7,480,567 B2 * | 1/2009 | Suomela et al. | 701/211 |
| 7,496,445 B2 * | 2/2009 | Mohsini et al. | 701/206 |
| 7,577,444 B2 | 8/2009 | Bird et al. | |
| 7,620,493 B2 * | 11/2009 | Stankiewicz et al. | 701/207 |
| 7,770,782 B2 | 8/2010 | Sahud | |
| 7,818,083 B2 | 10/2010 | Glenn et al. | |
| 2004/0150527 A1 | 8/2004 | Harper et al. | |

(Continued)

OTHER PUBLICATIONS

International Search Report and Written Opinion for Application No. PCT/US2011/029549, mailed Feb. 9, 2011.

(Continued)

*Primary Examiner* — James Trammell
*Assistant Examiner* — McDieunel Marc
(74) *Attorney, Agent, or Firm* — Nutter McClennen & Fish LLP

(57) ABSTRACT

A wayfinding device is provided for giving directions to a desired destination within a building having a plurality of wayfinding beacons configured to transmit data using an ultrasound signal. The ultrasound signal can include a plurality of bursts, wherein a sequence of predefined time intervals between consecutive bursts within the plurality of bursts uniquely identifies each wayfinding beacon. The wayfinding device is separate from the wayfinding beacons and includes a wayfinding beacon recognition component configured to identify a wayfinding beacon when the device receives the data through the ultrasound signal from a wayfinding beacon. The device is further programmed to provide directions to a user of the device in a direction toward the desired destination in response to identifying a wayfinding beacon.

23 Claims, 16 Drawing Sheets

U.S. PATENT DOCUMENTS

| | | |
|---|---|---|
| 2005/0248461 A1 | 11/2005 | Lane et al. |
| 2007/0008146 A1 | 1/2007 | Taylor et al. |
| 2007/0020212 A1 | 1/2007 | Bernal et al. |
| 2007/0257803 A1 | 11/2007 | Munro et al. |
| 2008/0100441 A1 | 5/2008 | Prodanovich et al. |
| 2008/0120029 A1* | 5/2008 | Zelek et al. .................. 701/213 |
| 2008/0246599 A1 | 10/2008 | Hufton et al. |
| 2009/0184823 A1 | 7/2009 | Tessier |
| 2009/0189759 A1 | 7/2009 | Wildman et al. |
| 2010/0321180 A1 | 12/2010 | Dempsey |

OTHER PUBLICATIONS

Infection Prevention Systems, How clean are your employees', www.cleanerhands.net.

International Search Report and Written Opinion, from PCT/US10/039002, mailed Feb. 9, 2011.

InterActive Wayfinding Software, http://www/here2theresoftware.com.

* cited by examiner

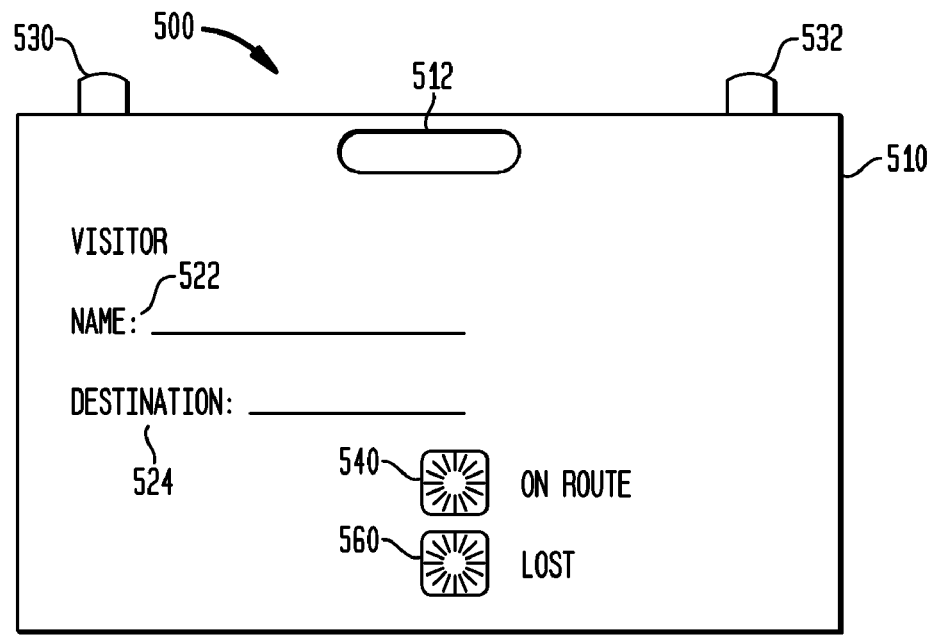
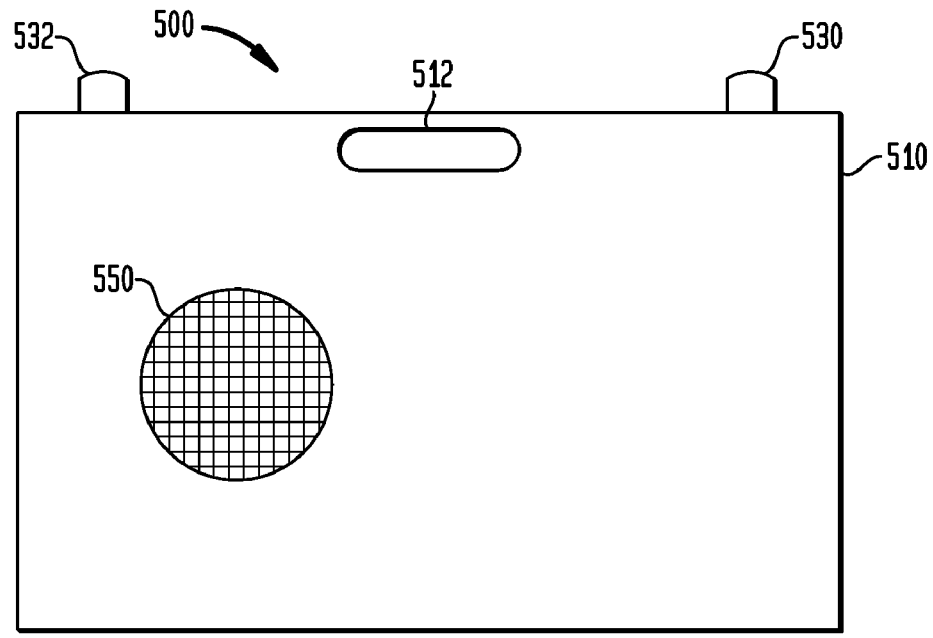

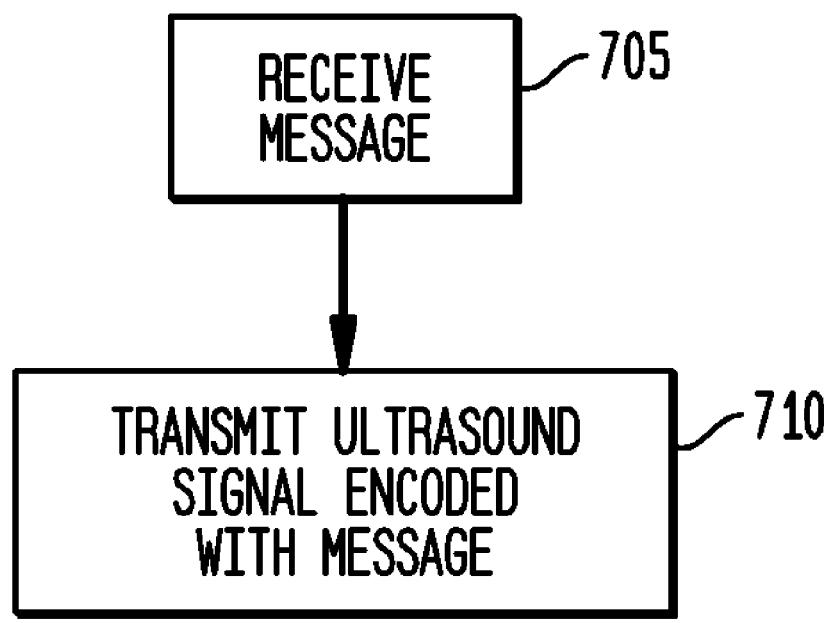

1350

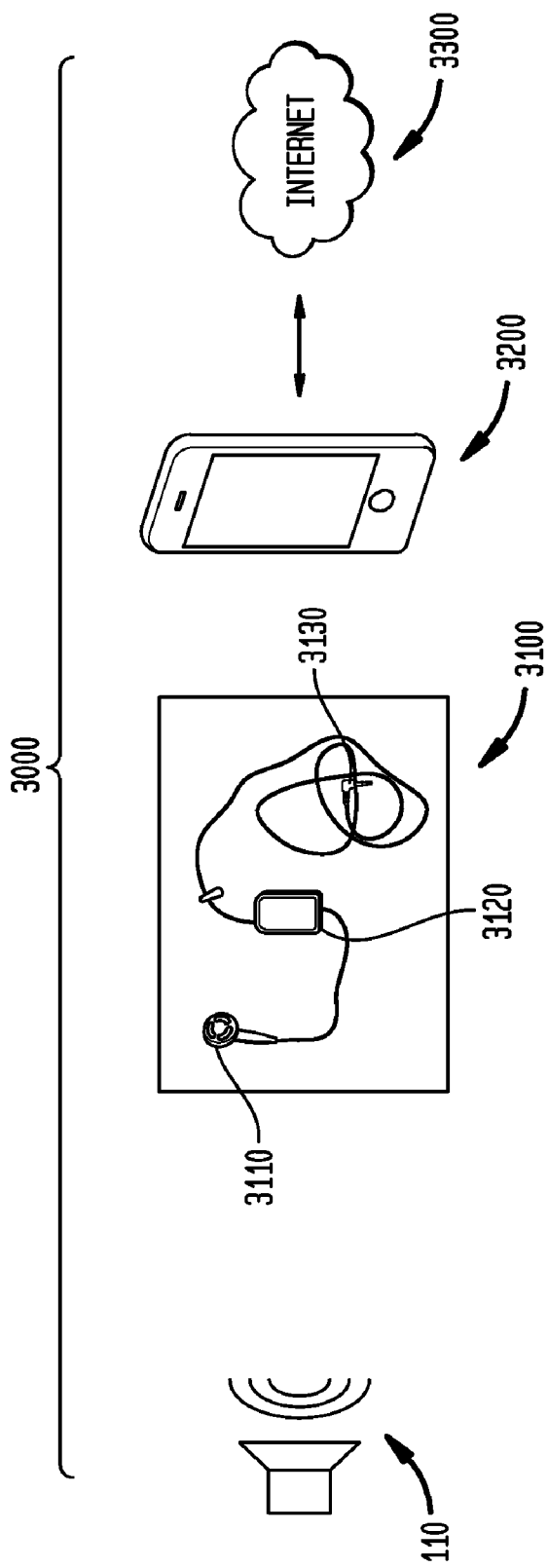

WAYFINDING SYSTEM

FIELD

Exemplary embodiments of the present invention relate to providing navigational or wayfinding aid to pedestrians within buildings. More specifically, exemplary embodiments relate to communication by wayfinding beacons that use ultrasound transmission of data to a pedestrian used programmable device.

BACKGROUND

For most people, indoor navigation, especially in large or unfamiliar buildings, can be difficult. A large number of people also report having some form of low-vision defined by difficulty reading print material in a typical newspaper with corrective lenses—this makes indoor navigation for these people even more difficult. Common causes of low-vision include (but are not limited to) macular degeneration, glaucoma, and diabetic retinopathy. For example, someone who has age-related macular degeneration may lose vision in the central three degrees of their visual field with the remaining portion of their visual field remaining intact. Not surprisingly, many people with age-related macular degeneration must also visit hospitals or other large buildings serving the public, so indoor navigation is particularly important for these service providers.

The American's With Disabilities Act (ADA) requires buildings that serve the public to be accessible to people with disabilities, including blind and low-sight individuals. While many contemporary buildings have been fitted with Braille signs that identify room numbers and other significant landmarks, the utility of these signs is marginal given that they are difficult to localize and many low-vision or blind individuals either do not use Braille or cannot read Braille.

As a result, there is a need for a system, apparatus, and method of improving navigation for all people, but in particular low-vision and blind users in unfamiliar buildings using a navigation aid that guides and orients a user within an unfamiliar indoor environment and provides instructions to a desired location.

SUMMARY

In view of the above, exemplary embodiments provide a system to provide directions to a destination. The system, based upon an individual's location, determines required next steps to reach the destination. The system is configurable, as necessary, based on the area or individuals involved.

For example, the system provided by exemplary embodiments is capable of establishing waypoint zones and determining when individuals are located in and near the waypoint zones. A waypoint zone may be established using a signal transmission from a wayfinding beacon. Each individual interacting with the waypoint zone is provided with a programmable device. The programmable device recognizes a signal transmitted by the wayfinding beacon, and provides directions to the user to help the user reach a desired destination.

Some conventional techniques of establishing a waypoint zone involve transmitting infrared (IR) signals to designate the boundaries of the zone. Infrared signals are line-of-sight (LOS), i.e. the signals generally cannot travel through or around obstacles. Infrared is suitable for some conventional zone-establishing systems because infrared signals do not penetrate walls and can be contained within well-defined zones.

However, there are significant drawbacks to conventional techniques of establishing waypoint zones with the transmission of infrared signals. Generally, conventional systems do not work if the line-of-sight between an infrared transmitter and an infrared receiver is blocked, e.g. if a receiver device is covered by clothing. As a result, infrared signal receivers must always be carried within clear view of infrared transmitters, something that is not always possible or desirable.

Infrared signals are also susceptible to shadowing, which occurs when an obstacle obscures the main signal path between the infrared transmitter and receiver. Conventional techniques attempt to overcome the problem of shadowing by using a large and complex set of infrared transmitters to establish a single waypoint zone. These conventional techniques are expensive to install and require an extensive infrastructure.

Infrared waypoint systems also require a great deal of power in order to make the infrared light bright enough to work effectively. This means such systems are generally required to be powered by mains power, which is complex and expensive to install when many waypoint beacons are required.

Other conventional techniques of establishing a waypoint zone involve transmitting radio frequency (RF) signals or Radio Frequency Identification (RFID) signals to designate the boundaries of the zone. Radio frequency signals are not line-of-sight and can generally travel through or around obstacles. This characteristic allows radio frequency receivers, e.g. on a programmable device, to reliably receive signals from a radio frequency transmitter regardless of the topography of the zone. However, this non-line-of-sight characteristic also means that the radio frequency signals can penetrate walls and cannot reliably be contained within zones that are defined between a set of walls. For example, a radio frequency signal transmitting in a room to define a zone within the room may be received by radio frequency receivers outside the zone in adjacent rooms. Thus, in these conventional systems, a radio frequency receiver may have difficulty in identifying the source of a received signal.

In view of the drawbacks of using infrared and radio frequency signal transmissions in establishing waypoint zones, and despite the conventional view that ultrasound is not appropriate for data transmission, the system provided by exemplary embodiments uses ultrasound transmissions to establish waypoint zones. Ultrasound is less line-of-sight than infrared and more line-of-sight than radio frequency. Since ultrasound signals are not completely blocked by obstacles, transmitters and receivers can communicate reliably using ultrasound regardless of the topography of the area. On the other hand, since ultrasound signals cannot penetrate through walls, the system ensures that a waypoint zone is well-defined and that the transmission of an ultrasound signal establishing a waypoint zone is not received by receivers outside the waypoint zone. Although ultrasound signals are typically not suited to sending large amounts of data, exemplary embodiments provide systems and methods for encoding data in ultrasound signals and decoding data from encoded ultrasound signals. Exemplary systems and methods also mitigate the problem of multipath interference associated with ultrasound signals.

In accordance with one exemplary embodiment of the present invention, a wayfinding system provides directions to a desired destination. The system includes a wayfinding beacon configured to transmit data using an ultrasound signal in such a way that results in the creation of the waypoint zone in a vicinity of the wayfinding beacon. The system also includes a programmable device separate from the wayfinding beacon. The programmable device includes a waypoint zone recognition component configured to identify an interaction criterion for the waypoint zone when the programmable device receives data through the ultrasound signal within the waypoint zone. Upon the programmable device being disposed within the waypoint zone, the waypoint zone recognition component identifies the waypoint zone and provides directions to the user so that the user can progress toward the desired destination.

In further embodiments, a programmable device for use in the system, software for operating within the system, and a method of making a programmable device for use in the system are provided.

BRIEF DESCRIPTION OF THE FIGURES

These and other characteristics of the present invention will be more fully understood by reference to the following detailed description in conjunction with the attached drawings, in which:

FIG. 5A depicts a front perspective view of an exemplary programmable device wherein the programmable device is a badge;

FIG. 5B depicts a back view of the badge of FIG. 5A;

FIG. 7 is a flowchart of one exemplary embodiment of a methodology for establishing a waypoint zone;

FIG. 16 depicts a further exemplary embodiment of the invention.

DETAILED DESCRIPTION OF THE INVENTION

I. System

Figure 1:
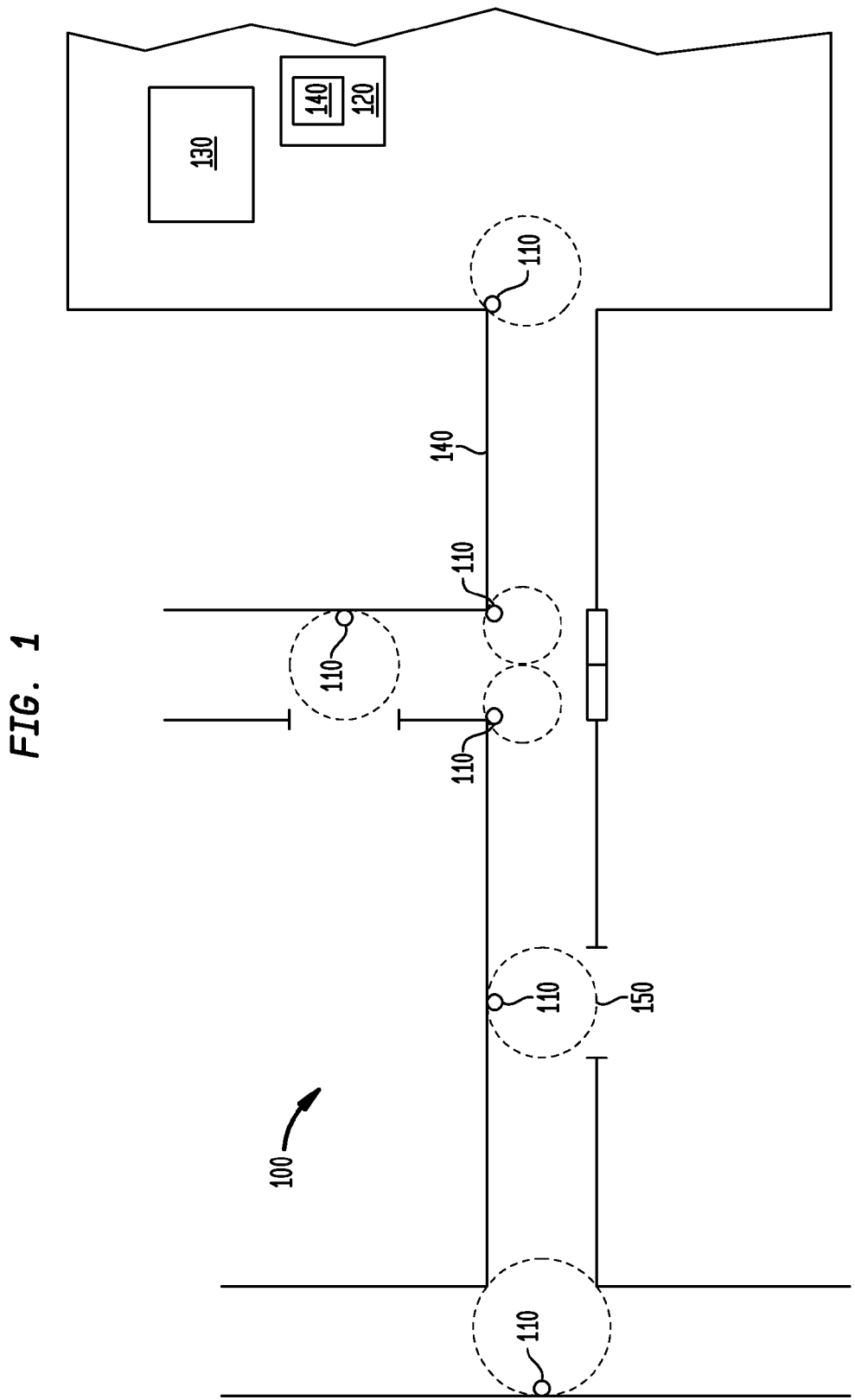
FIG. 1 depicts a diagram of an exemplary embodiment of a system for establishing a waypoint zone and monitoring interaction therewith.

Turning now to FIG. 1, an exemplary embodiment of a system 100 for in-building wayfinding includes a base station 130, a programmable device such as a badge 120, and a plurality of wayfinding beacons 110 creating waypoint zones 150. The programmable device 120 is programmed by the base station 130 to provide a route to the user's destination. A plurality of wayfinding beacons 110 are located at key waypoints through a building 140. When the programmable device 120 receives a data transmission from a wayfinding beacon 110, the programmable device decodes the data, consults the programmed route, and provides an indication to the user as to which direction to proceed.

II. Wayfinding Beacon

The system 100 includes the wayfinding beacon 110. The wayfinding beacon 110 establishes or designates waypoints by creating waypoint zones 150 via signal transmission. As such, the wayfinding beacon 110 may be configured for placement at a location where a waypoint is desired. A waypoint may be established anywhere that a pedestrian may make a directional choice. For example, waypoints may include elevators, lobbies, corridor branches, turns, etc. As such, the wayfinding beacon 110 is designed for easy placement at a number of locations. The wayfinding beacon 110 may also be mobile and may be moved to change the location of a waypoint.

The wayfinding beacon 110 should remain turned on at anytime that pedestrians may need navigational aid.

Figure 2:
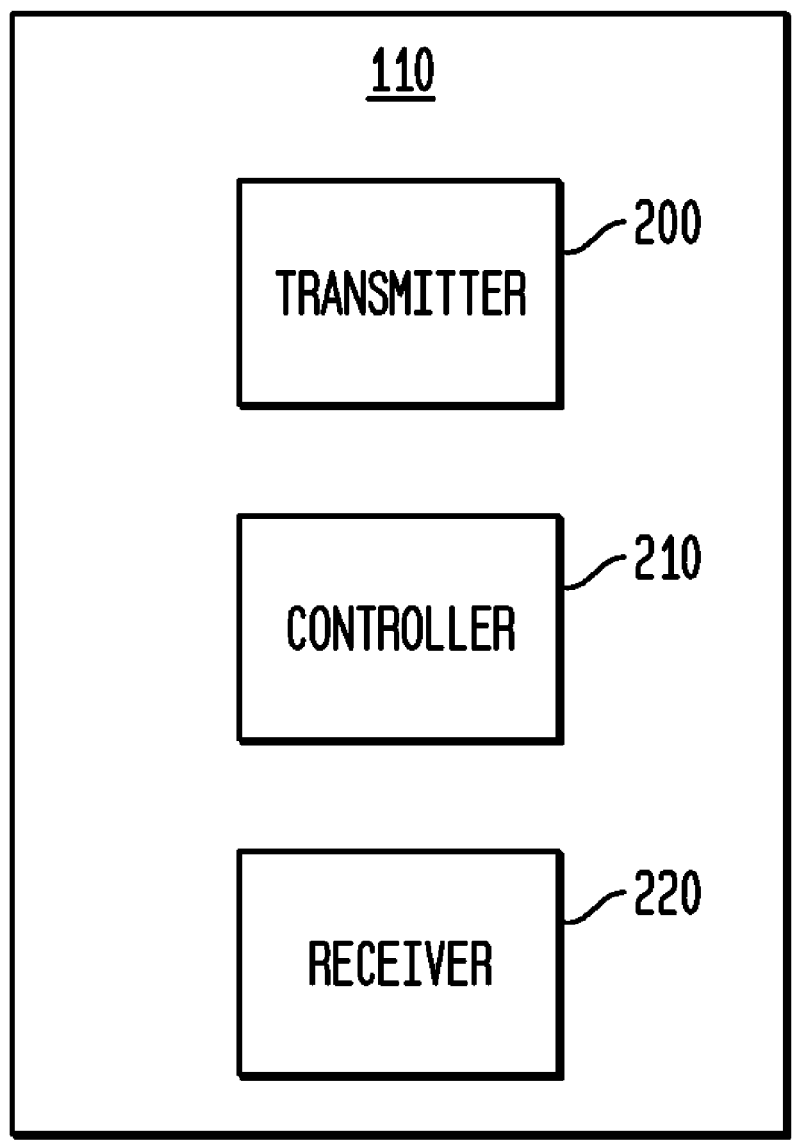
FIG. 2 depicts a block diagram of an exemplary embodiment of a wayfinding beacon.

FIG. 2 depicts an exemplary embodiment of a wayfinding beacon 110. In this embodiment, the wayfinding beacon 110 includes a transmitter 200, a controller 210, and a receiver 220. The transmitter 200 transmits an ultrasound signal to establish the waypoint. The range of the signal transmitted by the transmitter 200 establishes the outer limits of the waypoint, unless there are obstructions that limit the signal as discussed. In some embodiments, the wayfinding beacon 110 may include multiple transmitters.

The controller 210 is programmed to control the transmitter 200, the transmitted ultrasound signal, and the receiver 220. The controller 210 may be any type of controller, micro controller, processor, or microprocessor suitably programmed to control a transmitter 200. The controller 210 may dictate what type of signal the transmitter 200 transmits, or may dictate variations in how the signal transmits. The signal transmitted by the transmitter 200 to establish the waypoint zone may be a unique, semi-unique, non-unique signal or any combination thereof. In general, however, a unique signal may be used in correlation with a specific waypoint. In some embodiments, a waypoint identification number and/or other information, such as date and time information, is encoded in the ultrasound signal. The transmission of the signal may be continuous, periodic, in response to a signal received at the wayfinding beacon 110, or any combination thereof. The type of signal as well as signal strength may be user specified using the controller 210.

The controller 210 is also programmed to control the transmitter 200 such that the ultrasound signal transmitted by the transmitter 200 is encoded with data. The data may include, but is not limited to, information on the type and identity of the waypoint established by the ultrasound signal, information on the wayfinding beacon 110, etc.

In certain embodiments, the wayfinding beacon 110 further includes a receiver 220. In some embodiments, the receiver 220 may be used to receive signals for configuring the wayfinding beacon 110. In certain embodiments, the receiver 220 may be used in conjunction with the transmitter 200 and controller 210 to form a transponder that transmits a signal in response to a signal received at the wayfinding beacon 110. In some such embodiments, the range and/or type of signal transmitted may be determined by the signal received by the receiver 220.

Figure 3:
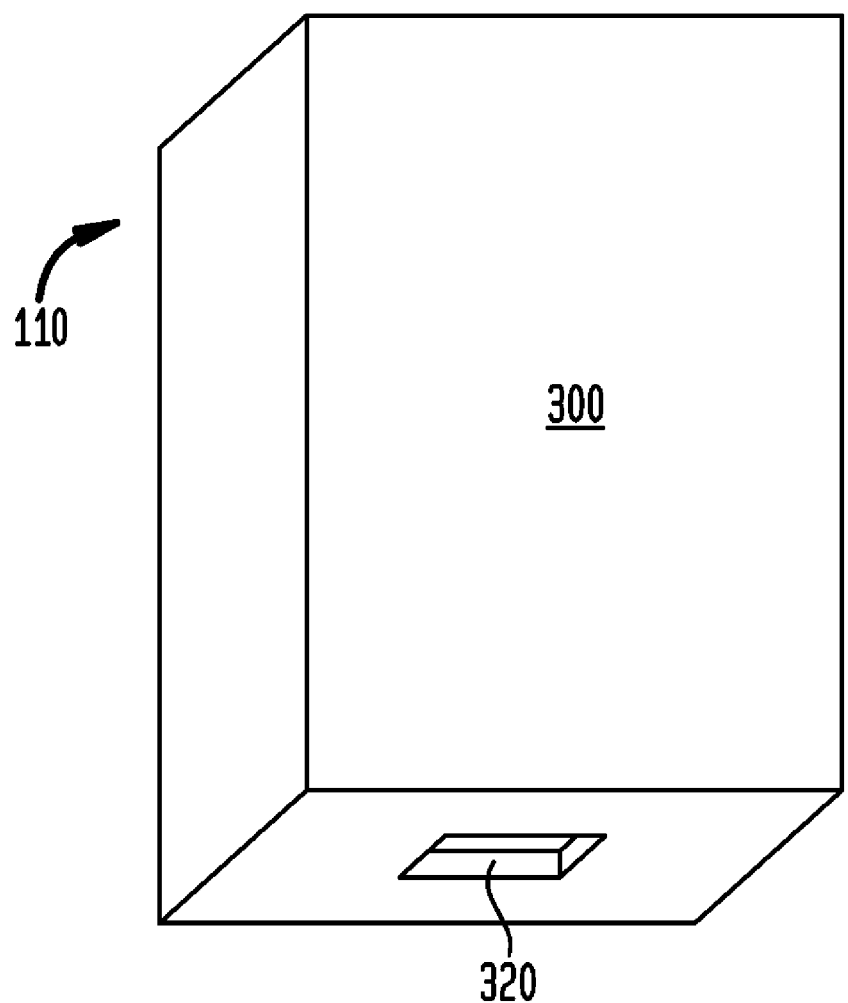
FIG. 3 depicts a perspective view of the exemplary wayfinding beacon of FIG. 2.

FIG. 3 depicts an exemplary embodiment of a wayfinding beacon 110 configured for placement at a location where a waypoint zone is desired. The wayfinding beacon 110 may include a housing 300 for housing the transmitter 200, controller 210, and the receiver 220. The housing may be formed of plastic, metal, or other suitable materials. The housing may be sized and dimensioned to allow for easy placement of the wayfinding beacon 110 at a number of locations and for movement of the wayfinding beacon 110 from one location to another. In certain embodiments, the wayfinding beacon 110 may be battery-powered. In other embodiments, the wayfinding beacon 110 may plug into a wall socket, or be hardwired into a power source or grid.

In some embodiments, the wayfinding beacon 110 may further include a data port 320 for the transfer of data to and from the wayfinding beacon 110. The data port 320 may be used to communicate with the controller 210 to configure the wayfinding beacon 110. Examples of suitable data ports include a serial port, such as a Universal Serial Bus (USB) port, or an Ethernet port. Other possible ports will be apparent to one skilled in the art given the benefit of this disclosure. In other embodiments, the transmitter 200 and receiver 220 of the wayfinding beacon 110 are used to transmit data back and forth from the wayfinding beacon 110.

III. Programmable Device

The system 100 also includes the programmable device 120. The programmable device 120 is separate from the wayfinding beacon 110 with which it interacts at any specific waypoint zone. In use, a user typically carries or wears the programmable device 120 to track the user's interactions with the waypoint zone 150. The programmable device 120 includes a waypoint zone recognition component 140 configured to recognize the waypoint zone 150 and identify one or more pre-defined interaction criteria for the waypoint zone 150. An exemplary embodiment of a waypoint zone recognition component 140 is depicted in FIG. 4.

Figure 4:
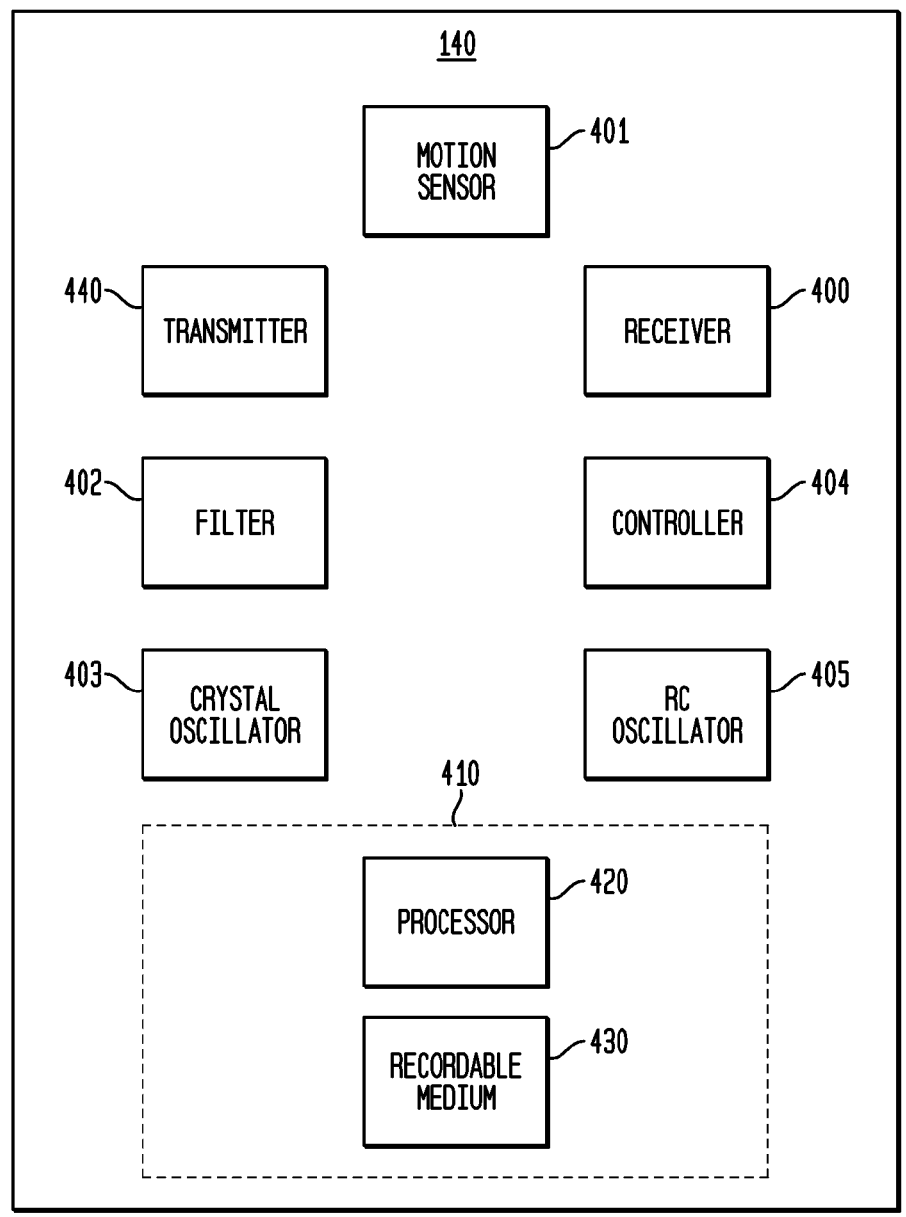
FIG. 4 depicts a block diagram of an exemplary embodiment of a programmable device.

In the exemplary embodiment depicted in FIG. 4, the waypoint zone recognition component 140 includes a receiver 400, a filter 402, a controller 404, a transmitter 440, and a computing device 410.

The receiver 400 is a suitable acoustic-to-electric transducer or sensor, e.g. a microphone, optimized to receive signals in the ultrasound frequency range, such as the signal transmitted from a wayfinding beacon 110. The electric signals corresponding to the acoustic signals received by the receiver 400 are filtered by an RC circuit filter 402 within the waypoint zone recognition component 140. The RC circuit filter 402 allows only those signals corresponding to the ultrasound frequency range to pass through.

The receiver 400 is configured to operate at low power even though the receiver listens for ultrasound signals at all times. The controller 404 is programmed to control the operation of the processor 420, and is normally kept off during the operation of the programmable device 120. The controller 404 and the processor 420 are turned on only when the filter 402 detects signals corresponding to the ultrasound frequency range, lets these signals through the filter 402, and outputs these signals. The controller 404 and the processor 420 are kept off at other times, e.g. when the receiver 400 receives audible sounds which do not establish waypoint zones. This selective activation of the controller 404 and the processor 420 reduces the power the programmable device 120 would otherwise consume.

Power is also consumed to maintain a high-accuracy crystal oscillator 403 that acts as the clock of the controller 404. In order to minimize power consumption by the controller clock, the timing of the controller 404 is kept using a lower-accuracy RC or LC oscillator 405 built into the controller 404, instead of the high-accuracy crystal oscillator 403. The RC or LC oscillator 405 timer is based on the charging and discharging of a capacitor through a resistor or current source. The accuracy of the RC or LC oscillator 405 is lower than the crystal oscillator 403, so the system must be able to tolerate some margin of error. To achieve this, the filter 402 allows in received signals of carrier frequencies above or below 2% of the ideal frequency.

To further reduce power consumption in the programmable device 120, the programmable device 120 may be equipped with a motion sensor 401 that detects whether the wearer of the device is moving or stationary. A wearer who is standing stationary is not likely to receive new information on waypoint zones in their vicinity. Upon the motion sensor 401 detecting that the wearer is stationary, the controller 404 may turn off the components of the programmable device 120 that consume power, e.g. the filter 402 and the processor 420. The controller 404 may subsequently turn on the components when the motion sensor detects that the wearer has started to move.

Preferably, the receiver 400 is of the same type as the transmitter 200 in the wayfinding beacon 110, which allows the programmable device to receive a transmission from the wayfinding beacon 110 designating a waypoint zone. In some embodiments, the programmable device 120 may include multiple receivers that may be of different types. In some embodiments, the receiver 400 may be used to receive signals for configuring the programmable device 120. For example, predetermined or pre-defined criteria for a waypoint zone 150 may be configured by a signal received at the programmable device 120. Likewise, the programmable device 120 can be configured to be associated with a particular user wearing the programmable device 120. For example, each programmable device 120 may have a unique identification number that can be associated with a particular user.

The computing device 410 includes a processor 420 and a recordable medium 430. The processor 420 may be any suitable processor capable of interfacing with the receiver 400 and programmed to process signals received by the receiver to recognize a waypoint zone 150, identify location information for the waypoint zone 150, and determine directional prompts that should be given to the user. Suitable processors will be apparent to one skilled in the art given the benefit of this disclosure. The recordable medium 430 is used to store instructions for the processor 420, including waypoint guidance instructions, and data obtained or generated by the processor 420, including location information. Such data may include the date, time, and result of any interaction with a waypoint zone 150. The recordable medium 430 may be a memory device that is provided integrally with, or separate from, the programmable device 120. Other suitable recordable mediums will be apparent to one skilled in the art given the benefit of this disclosure.

In an exemplary embodiment, the ultrasound signal received at the receiver 400 is encoded with data. In this embodiment, the processor 420 of the programmable device 120 is programmed to process the received ultrasound signal and decode the data encoded in the ultrasound signal.

In some embodiments, the waypoint zone recognition component 140 may further include one or more transmitters 440. The one or more transmitters 440 are configured to transmit ultrasound signal from the programmable device 120. In accordance with some embodiments of the present invention, the programmable device may include multiple transmitters.

In certain embodiments, the one or more transmitters 440 may be used in conjunction with the receiver 400 in a transponder configuration. In such a configuration, the one or more transmitters 440 transmits a query signal to the receiver 220 of the wayfinding beacon 110 that in turn transmits a signal in response from the transmitter 200 of the wayfinding beacon 110. In some such embodiments, the signal transmitted by the one or more transmitters 440 of the waypoint zone recognition component 140 determines the range and/or type of signal transmitted by the wayfinding beacon 110.

In some other embodiments, the receivers 400 and transmitters 440 of programmable devices 120 could be configured to interact directly with each other without the need for wayfinding beacons 110. Such embodiments could be adapted for many uses, including, for example, broadcasting the presence of one user who is searching for another and is nearby.

FIGS. 5A and 5B depict an exemplary embodiment of a programmable device 120, wherein the programmable device is a badge 500. The badge may be in the form of a standard institution-specific identification badge. FIG. 5A depicts a front view of the badge 500. FIG. 5B depicts a back view of the badge 500.

The badge 500 includes a housing 510 containing the waypoint zone recognition component 140. The housing 510 includes a thru-hole 512 for attaching a clip or lanyard to the badge 500. The housing 510 may be made of plastic or other suitable materials. On the front of the badge 500, identifying information for the wearer of the badge may be provided. This may include the name 522 and destination 524 of the associated person. In some embodiments, the badge 500 may further include an external receiver 530 and/or an external transmitter 532. Preferably, a battery, such as a rechargeable or replaceable battery, powers the badge 500. In some embodiments, the badge 500 may include a port, such as a USB or Ethernet port, that may be used for data transfer and charging the battery.

In certain embodiments, the programmable device 120 is capable of providing notice of the waypoint zone upon entering or when inside the waypoint zone. The notice may be audible, visual, tactile, or any combination thereof. In the example of FIGS. 5A and 5B, a visual notice is provided by a light-up indicator 540, such as a light emitting diode (LED) on the front side of the badge 500. In the case of guiding a visually impaired person, this visual notice could serve to alert others in the area that the visually impaired person is in the right place. In certain other embodiments, a more detailed visual notice could be employed to help guide hearing impaired patients. An audible notice or alarm is provided by a speaker 550 on the back side of the badge 500 as shown in FIG. 5B. A tactile notice may be provided by vibration.

In some embodiments, the programmable device 120 may additionally provide notice that the wearer of the badge is not on the designated route to their destination. When the programmable device enters into an off-route mode, the notice may be audible, visual, or tactile. In the example of FIGS. 5A and 5B, a visual notice is provided by a light-up indicator 560, such as a light emitting diode (LED) on the front side of the badge 500, as shown in FIG. 5A. In the case of guiding a visually impaired person, this visual notice could serve to alert others in the area that the visually impaired person is not in the right place and may need assistance. In certain other embodiments, a more detailed visual notice could be employed to help guide hearing impaired patients. An audible notice is provided by the speaker 550 on the back side of the badge 500 as shown in FIG. 5B. A tactile notice may be provided by vibration.

Figure 6A:
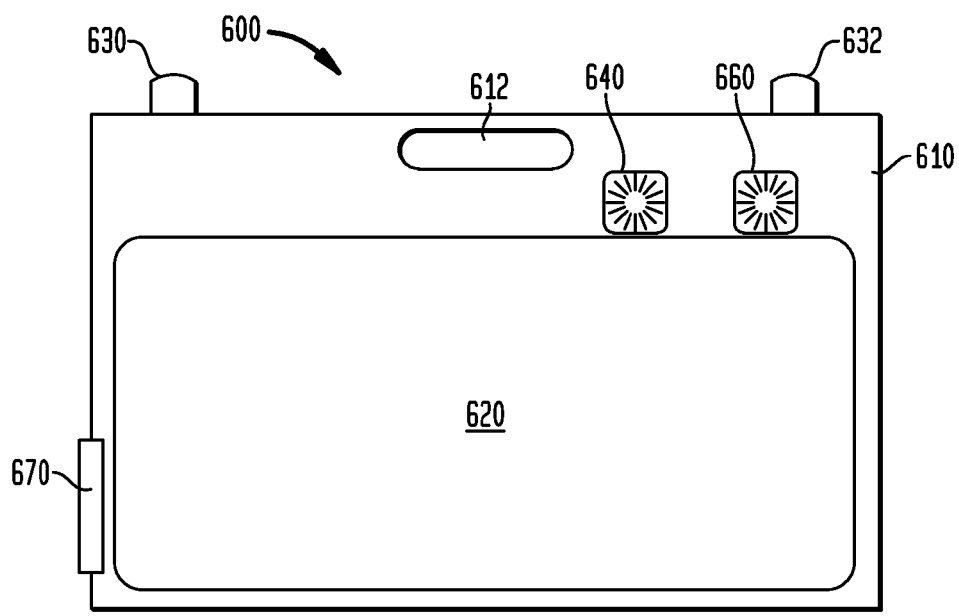
FIG. 6A depicts a front perspective view of an exemplary programmable device wherein the programmable device is a badge-holder.
Figure 6B:
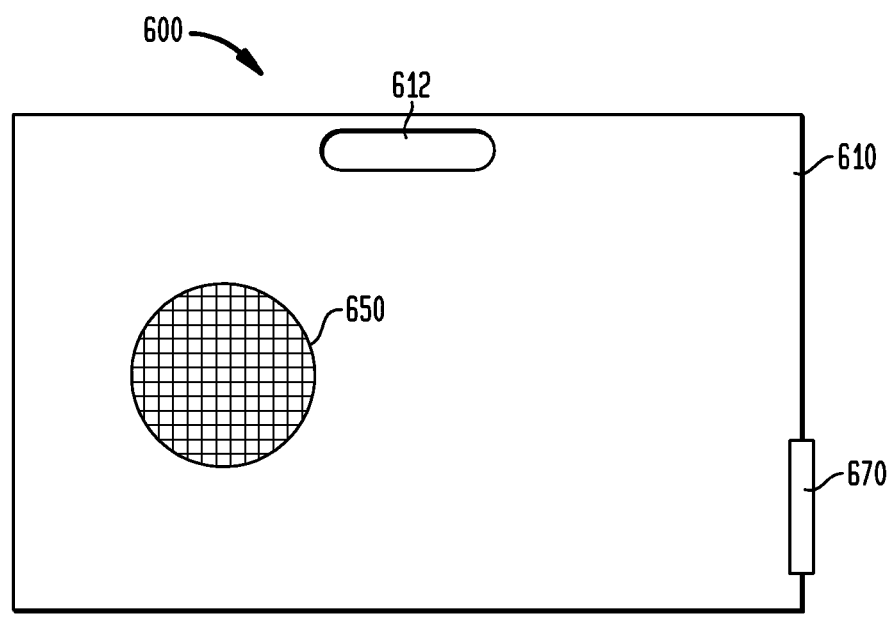
FIG. 6B depicts a back view of the badge-holder of FIG. 6A.

FIGS. 6A and 6B depict one exemplary embodiment of a programmable device wherein the programmable device is a badge holder 600, wherein the programmable device is configured to attach to a standard institution-specific identification badge. FIG. 6A depicts a front view of the badge holder 600. FIG. 6B depicts a back view of the badge holder 600.

Similar to the badge 500 of FIGS. 5A and 5B, the badge holder 600 includes a housing 610 containing the waypoint zone recognition component 140. The housing 610 includes a thru-hole 612 for attaching a clip or lanyard to the badge holder 600. The housing 610 may be made of plastic or other suitable materials. The badge holder 600 pairs with a traditional identification badge. The badge holder 600 has an area 620 designed to receive and hold an identification badge. Preferably, the badge holder 600 may be powered by a battery, such as a rechargeable or replaceable battery. In some embodiments, the badge 500 may include a port, such as a USB or Ethernet port, that may be used for data transfer and charging the battery.

As with the badge 500 of FIGS. 5A and 5B, the badge holder 600 may provide notice that the badge holder 600 is successfully navigating between wayfinding beacons 110. The notice may be audible, visual, tactile, or any combination thereof. In the example of FIGS. 6A and 6B, a visual notice is provided by a light-up indicator 640, such as a light emitting diode (LED) on the front side of the badge holder 600, as shown in FIG. 6A. In the case of guiding a visually impaired person, the visual notice serves to alert others in the area that the visually impaired person is in the right place. In certain other embodiments, a more detailed visual notice could be employed to help guide hearing impaired patients. An audible notice is provided by a speaker 650 on the back side of the badge holder 600 as shown in FIG. 6B. A tactile notice may be provided by vibration.

The badge holder 600 may also provide notice that the wearer of the badge is not successfully navigating between the wayfinding beacons 110. The notice of path deviation may be audible, visual, tactile, or any combination thereof. In the example of FIGS. 6A and 6B, a visual notice is provided by a light-up indicator 660, such as a light emitting diode (LED) on the front side of the badge holder 600, as shown in FIG. 6A. In the case of guiding a visually impaired person, the visual notice serves to alert others in the area that the visually impaired person is not in the right place and may need assistance. In certain other embodiments, a more detailed visual notice could be employed to help guide hearing impaired patients. An audible notice is provided by the speaker 650 on the back side of the badge holder 600 as shown in FIG. 6B. A tactile notice may be provided by vibration.

IV. Data Encoding in Ultrasound Signals

The ultrasound signals which are used to establish a waypoint zone may be encoded with data. The data may include, but is not limited to, information on the type and identity of the waypoint zone established by the ultrasound signal, information on the wayfinding beacon 110, etc. Each wayfinding beacon 110 encodes its ultrasound signal transmission with the data. The controller of the wayfinding beacon 110 is programmed to control the transmitter of the wayfinding beacon 110 such that the ultrasound signal transmitted by the transmitter is encoded with the data.

In an exemplary embodiment, data encoded in the ultrasound signal transmitted by a wayfinding beacon 110 identifies a specific waypoint zone. The data may be in the form of a message. In this embodiment, the message is encoded in the timing between successive bursts of ultrasound carrier cycles.

Each wayfinding beacon 110 transmits a message including an assigned zone ID at regular intervals. The zone ID may uniquely identify a specific waypoint zone. For example, the zone ID transmitted by all elevators may have a particular value, e.g. 0. Other wayfinding beacons may have zone IDs with values 1 through 1023. In exemplary embodiments, more than one wayfinding beacon 110 may be assigned the same zone ID. However, duplicate zone IDs are not assigned to nearby waypoint zones that someone wearing a programmable device 120 could move between within one minute.

FIG. 7 is a flowchart of one exemplary embodiment of a methodology for establishing a waypoint zone. The wayfinding beacon 110 receives a 15-bit message to be encoded in the ultrasound signal that establishes the waypoint zone (step 705). Alternatively, the wayfinding beacon 110 generates the message based on the zone ID associated with the waypoint zone and a cyclic redundancy check (CRC) checksum associated with the zone ID. In this embodiment, the wayfinding beacon 110 may receive the zone ID and/or the CRC checksum, or determine these values itself. The wayfinding beacon 110 generates the 15-bit message by setting the high 10 bits of the message to the zone ID and the low 5 bits of the message to the CRC checksum.

The wayfinding beacon 110 then establishes the waypoint zone by transmitting an ultrasound signal using an ultrasound transmitter (step 710). The wayfinding beacon 110 encodes the ultrasound signal with the 15-bit message which includes the zone ID uniquely identifying the waypoint zone. The message is encoded in the sequence of time intervals between consecutive bursts of the ultrasound signal. More specifically, the wayfinding beacon 110 periodically transmits 7 bursts of the ultrasound signal, with each burst being a sequence of 6 carrier cycles. The message is encoded in the 6 time intervals between consecutive bursts in the 7 bursts of the ultrasound signal, such that each nominal time interval corresponds to a particular character of the message.

Exemplary implementations of data encoding in ultrasound signals are layered into pulses, bursts, characters, and messages which will now be described.

Pulse: A "pulse" denotes an input received by a processor decoding an ultrasound signal, the input indicating that one ultrasound carrier cycle has been received. In an exemplary embodiment the ultrasound carrier frequency is about 40 KHz, at which a pulse occurs every 25 microseconds when the carrier is on. The carrier frequency may be derived from a low-cost and low-power RC or LC timer oscillator built into the controller of the wayfinding beacon. The RC or LC timer oscillator is not highly accurate and, therefore, the system is capable of tolerating some margin of error. In an exemplary embodiment, ultrasound receivers receiving the ultrasound pulses expect that the carrier frequency is within 2% of the ideal frequency, 40 KHz, as the pulses arrive at the receivers.

Other errors can accumulate before the ultrasound pulses are ultimately received at the ultrasound receiver and processed by firmware in the receiving processor. These errors include inherent jitter in the ultrasound amplifier of the transmitter and inherent jitter in the receiver. Additional jitter is caused by quantizing the time to integer cycles of a reference clock and by sampling data in the firmware. To accommodate for these and other errors, in an exemplary embodiment, the system allows for up to 8% error in the receiving firmware, i.e. in the ultrasound receiving processor. That is, in an exemplary embodiment, the receiving firmware interprets the time intervals between pulses as being valid if the time intervals are between 23 and 27 microseconds, inclusive.

Burst: A "burst" denotes a sequence of pulses in which all the time intervals between consecutive pulses are within a valid range, i.e. are between 23 and 27 microseconds, inclusive, in the above exemplary embodiment. The valid time intervals between consecutive pulses in a burst indicate that the pulses were likely the result of receiving ultrasound at the carrier frequency.

Figure 8A:
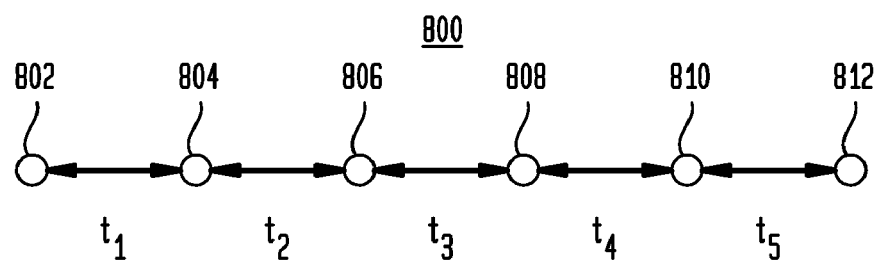
FIG. 8A depicts the pulses in an exemplary embodiment of a burst of ultrasound signal.

In an exemplary embodiment illustrated in FIG. 8A, a burst 800 is detected when 6 successive pulses (802-812) with valid time intervals (t1-t5) are received. A time interval between consecutive pulses is valid if the time interval is between 23 and 27 microseconds, inclusive. Due to the resonance of the ultrasound transmitters and receivers, the first couple of carrier cycles may be received at lower amplitudes and, therefore, possibly not be received at all. The ultrasound transmitters thus transmit at least 8 carrier cycles per burst. However, increasing the number of carrier cycles per burst lengthens the time that the ultrasound signal persists in the environment and increases the possibility of the signal echoing from surfaces and being received with a delay. In order to prevent reception of delayed signals, the ultrasound transmitters do not transmit more than 10 carrier cycles per burst. That is, the ultrasound transmitters transmit 8 to 10 carrier cycles per burst.

After receiving a valid burst of the ultrasound signal, the ultrasound receivers ignore additional pulses for a blackout period in order to minimize or eliminate multipath interference in the ultrasound signals. Multipath interference is a phenomenon whereby a wave from a source travels to a detector via two or more paths and, under certain conditions, the two or more components of the wave interfere. The ultrasound signals echo around the environment and could be received multiple times at a single receiver. The minimum valid time interval between bursts is chosen such that the echo from the previous burst has died down. In an exemplary embodiment the absolute minimum valid time interval between bursts is 32.23 milliseconds. The blackout period is set so that it expires at least in time to receive the first pulse in the next burst, including the margin for all possible sources of error in the system. In an exemplary embodiment the minimum blackout time is 30 milliseconds, which corresponds to about 10 meters of propagation distance. In exemplary embodiments, any desired blackout time can be selected and used to configure the ultrasound receiver.

Character: Characters are the constituent components of a message transmitted by a wayfinding beacon. A "character" denotes the data encoded in the single time interval between two consecutive bursts. There is a limited range of valid time intervals between two consecutive bursts. Valid characters fall within this valid range, with each unique character corresponding to a predefined, nominal time interval between two consecutive bursts. Time intervals falling outside the valid range do not correspond to any characters.

Exemplary embodiments provide 9 valid characters: start-of-message (SOM) and integer values 0 through 7. The SOM character corresponds to a nominal time interval of $\frac{1}{32}$ seconds (31.25 milliseconds). Additional characters correspond to time interval increments of $1/512$ seconds (1.953 milliseconds) added to the SOM time interval, with the 0 character being the first and the 7 character the last. That is, the SOM character time is $1/32$ seconds (31.25 milliseconds), the 0 character is $1/32+1/512$ seconds, the 1 character is $1/32+2/512$ seconds, the 2 character is $1/32+3/512$ seconds, the 3 character is $1/32+4/512$ seconds, the 4 character is $1/32+5/512$ seconds, the 5 character is $1/32+6/512$ seconds, the 6 character is $1/32+7/512$ seconds, and the 7 character is $1/32+8/512$ seconds (46.88 milliseconds).

There is no illegal time between valid character times. In the above exemplary embodiment, a time interval is first rounded to the nearest multiple of $1/512$ seconds to interpret the character encoded in the time interval. That is, the valid time interval associated with each character is the nominal time interval±$1/1024$ seconds (±977 microseconds). Therefore, the range of valid character times is between the minimum possible SOM character ($1/32-1/1024$ seconds=30.27 milliseconds) and the maximum possible 7 character ($1/32+8/512+1/1024$ seconds=47.86 milliseconds). Burst time intervals outside this range are invalid.

Message: A "message" denotes at least the zone ID along with a cyclic redundancy check (CRC) checksum associated with the zone ID. The zone ID may be an identifier associated with a waypoint zone that indicates the type of the waypoint zone (e.g. elevator, hallway, door, etc) and/or may be a unique identifier associated with the waypoint zone (e.g. room 401, elevator 2, etc). The CRC checksum is a number that is used to determine the validity of the message, i.e. to determine whether the message has been altered during transmission of the ultrasound signal.

A message is a specific sequence of characters. The size of the message therefore depends on the number of characters in the message. Each character is encoded in a single time interval between two consecutive bursts of ultrasound signal. Thus, the size of the message is determined by the number of bursts that incorporate the message. That is, the larger the number of bursts that form a message, the larger the message.

A suitable message size and a corresponding number of bursts are selected for use in exemplary embodiments. The wayfinding beacon periodically transmits the ultrasound signal according to the number of bursts per message. In a very large facility with a need for a very large number of zone IDs, the message size and the number of bursts per message may be very large. On the other hand, in a small facility, the message size and the number of bursts per message may be smaller.

Figure 8B:
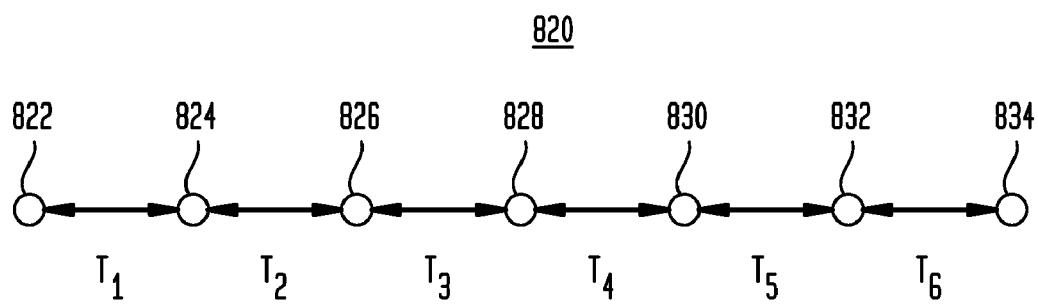
FIG. 8B depicts the bursts in an exemplary embodiment of a message of ultrasound signal.

In an exemplary embodiment illustrated in FIG. 8B, a message 820 is a specific sequence of 6 valid characters in succession, the characters corresponding to 6 nominal time intervals between consecutive bursts within 7 bursts in succession (822-834). The first character is the SOM (start-of-message) character, and the remaining characters are data characters (0-7). Each character is encoded in a single time interval between two consecutive bursts in the message (T1-T6). Thus, the message is encoded in the sequence of time intervals between consecutive bursts within the 7 valid bursts.

Figure 8C:
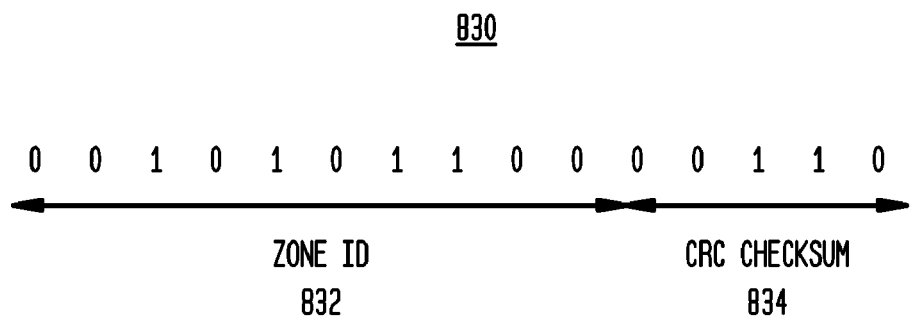
FIG. 8C depicts the message bits in an exemplary embodiment of a message of ultrasound signal.

As illustrated in FIG. 8C, a message 830 contains 15 bits of information, the 10 most significant bits of the message corresponding to the zone ID 832, and the 5 least significant bits of the message corresponding to the CRC checksum 834 for the zone ID.

Since all messages begin with an SOM character and this character does not appear otherwise, a received SOM character is always interpreted as the start of a new message. So, when an SOM character is received, the previous message is discarded. This guarantees that the start of a message can always be recognized regardless of what sequence of pulses precedes the start of the message. That is, an ultrasound receiver is always "listening" for the start of a message regardless of where the receiver thinks it is within a message.

A complete message is only received if the above-described rules for valid pulses, bursts, characters, and messages are adhered to over the whole message. A message is discarded immediately if any of these rules is broken over the message.

If a rule violation is detected at the pulse or burst level, the message interpretation logic is reset. That is, the message is discarded and the next pulse received is assumed to be the first pulse of the first burst of a message.

The last burst of a message may also be the first burst of the next message. That is, after a complete message is received, the message interpretation logic is reset to expecting the next burst to end an SOM character, not start an SOM character.

Figure 9:
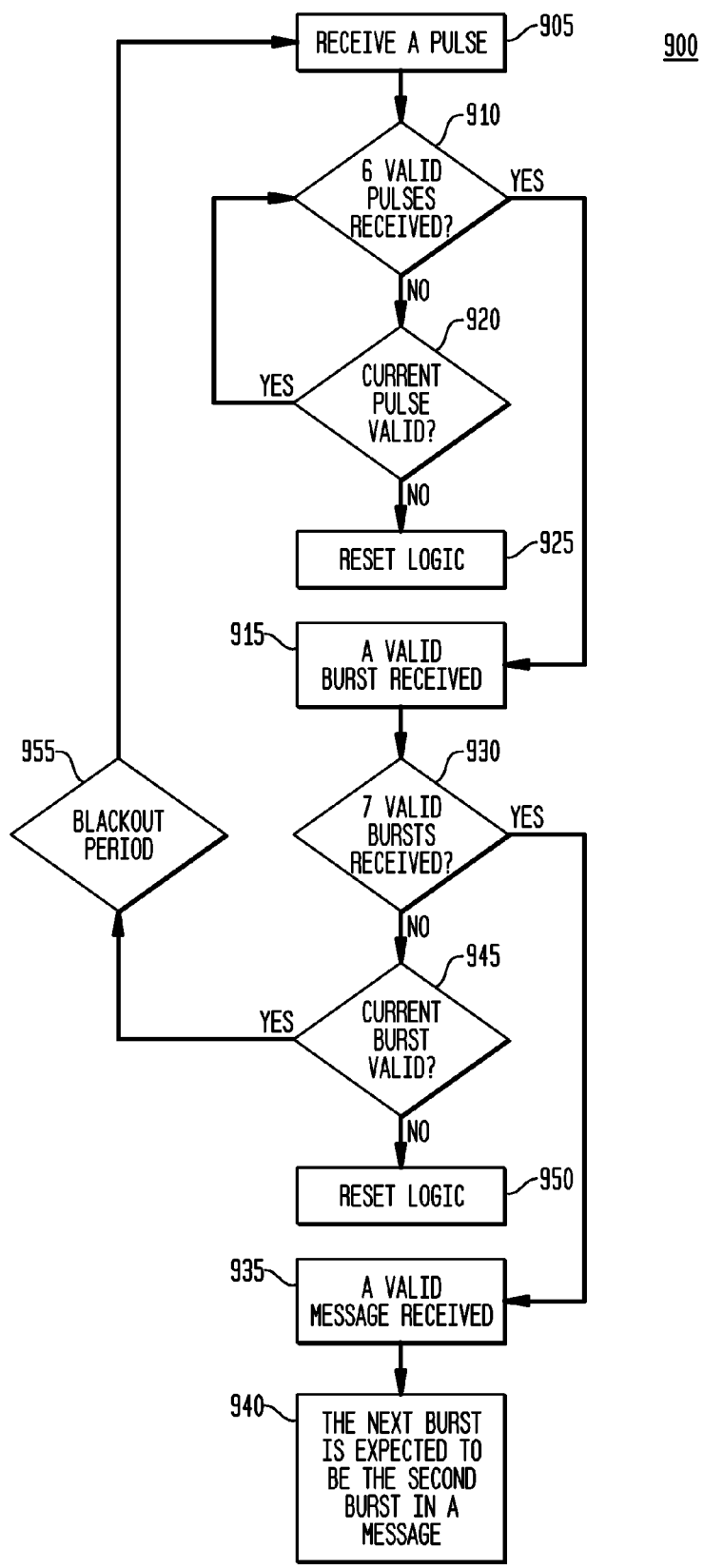
FIG. 9 is a flowchart of an exemplary message interpretation logic used in decoding a message encoded in an ultrasound signal.

FIG. 9 depicts a flow chart 900 of one example embodiment of message interpretation logic used to decode a message encoded in an ultrasound signal. The message interpretation logic may be followed by a programmable device in decoding a message encoded in an ultrasound signal that is received at the programmable device. A processor of the programmable device is programmed to process the received ultrasound signal and decode the data encoded in the ultrasound signal.

A pulse of ultrasound signal is received at an ultrasound receiver (step 905). If 6 valid pulses have been received (step 910), then a valid burst of ultrasound signal has been received (step 915). However, if 6 valid pulses have not been received (step 910), then the message interpretation logic determines whether the current pulse is valid (step 920). If the current pulse is the first pulse in the burst, then the current pulse is considered valid. However, if the current pulse is not the first pulse in the burst, then the pulse is valid only if the time interval between the current pulse and the immediately previous pulse is between 23 and 27 microseconds. If the current pulse is not valid, then the message interpretation logic is aborted (step 925). That is, the next received pulse is assumed to be the first pulse of the first burst of a new message. However, if the current pulse is valid, then the next pulse is received (step 910).

If 6 valid pulses have been received, then a valid burst of ultrasound signal has been received (step 915). If 7 valid bursts have been received (step 930), then a valid message has been received (step 935). In this case, the immediately subsequent burst is expected to be the second burst in a new message (step 940).

However, if 7 valid bursts have not yet been received (step 930), then the message interpretation logic determines whether the current burst is valid (step 945). If the current burst is the first burst in the message, then the current burst is considered valid. If the current burst is the second burst in the message, then the current burst is valid only if the time interval between the current burst and the immediately previous burst corresponds to the SOM character, i.e. is $1/32±1/1024$ seconds. If the current burst is the third to seventh burst in the message, then the current burst is valid only if the time interval between the current burst and the immediately previous burst corresponds to a data character (0-7).

If the current burst is not valid, then the message interpretation logic is aborted (step 950). The next received pulse is assumed to be the first pulse of the second burst of a new message. However, if the current burst is valid, then the next pulse in the next burst of the message is received after a blackout period (step 955). The blackout period is at least 30 milliseconds from the time the current pulse was received during which no further pulses are received. That is, the next pulse is received at least 30 milliseconds after the current pulse was received.

Message validation: As illustrated in FIG. 8C, the low 5 bits of each 15-bit message is a cyclic redundancy check (CRC) checksum 834. A CRC is a non-secure hash function designed to detect accidental changes to the raw zone ID 832 transmitted in the ultrasound signal. The wayfinding beacon calculates a short, fixed-length binary sequence, known as the CRC checksum, for each zone ID. The wayfinding beacon creates a 15-bit message by setting the low 5 bits of the message to the CRC checksum and the high 10 bits of the message to the zone ID. Thus, the ultrasound signal transmitted by the wayfinding beacon is encoded with a message containing both the zone ID and the CRC checksum.

Figure 10:
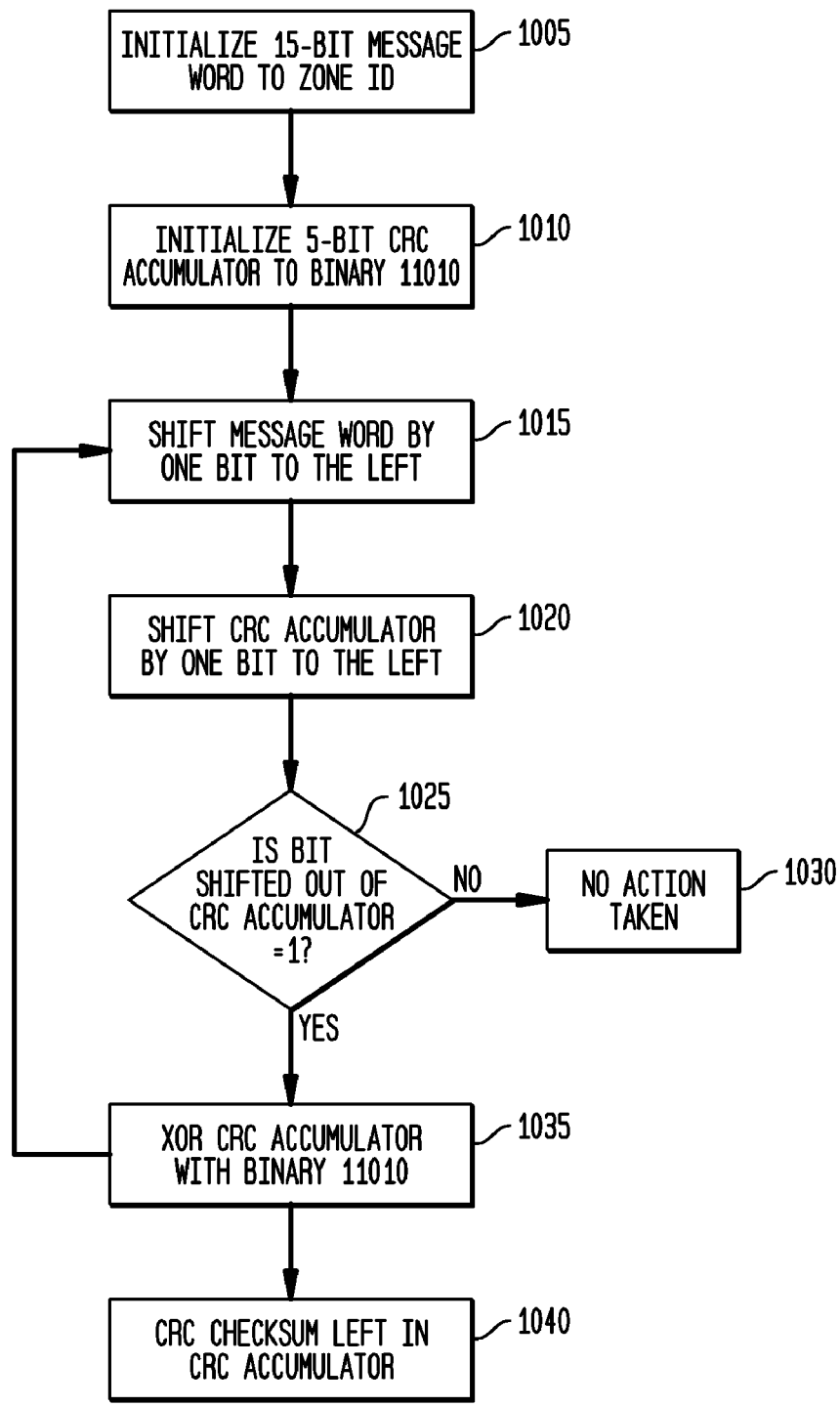
FIG. 10 is a flowchart of an exemplary method of calculating a cyclic redundancy check (CRC) checksum of a message.

FIG. 10 is a flowchart of an exemplary method of calculating a CRC checksum of a message. This method may be followed by a wayfinding beacon to determine a CRC checksum to incorporate into a message that is encoded in an ultrasound signal. A 15-bit message word is initialized to the zone ID (step 1005). A 5-bit CRC accumulator is initialized to binary 11010 (step 1010). The message word is shifted by one bit to the left, and the bit shifted out of the most significant bit is saved (step 1015). The CRC accumulator is shifted by one bit to the left (step 1020). The bit shifted into the least significant bit of the CRC accumulator is the bit shifted out of the most significant bit in step 1015, and the bit shifted out of the most significant bit of the CRC accumulator is saved. If the bit shifted out of the CRC accumulator in step 1020 was 1 (step 1025), then the CRC accumulator is XOR'ed with binary 11010 (step 1035). Otherwise, if the bit shifted out of the CRC accumulator in step 1020 was 0, then no action is performed (step 1030). Steps 1015-1035 are repeated once for each of the 14 remaining message bits. At the end of the procedure, the CRC checksum is left in the CRC accumulator (step 1040).

When a programmable device receives the ultrasound signal, the programmable device processes the signal to decode the message. The programmable device extracts the zone ID from the high 10 bits of the message and calculates a new CRC checksum corresponding to the message. If the new CRC checksum calculated by the programmable device is non-zero, the message contains a data error and the programmable device discards the message. However, if the new CRC checksum calculated by the programmable device is zero, the message is free of errors and the programmable device extracts the zone ID from the high 10 bits of the message. The CRC checksum bits of the message are no longer necessary and are discarded at this point.

Figure 11:
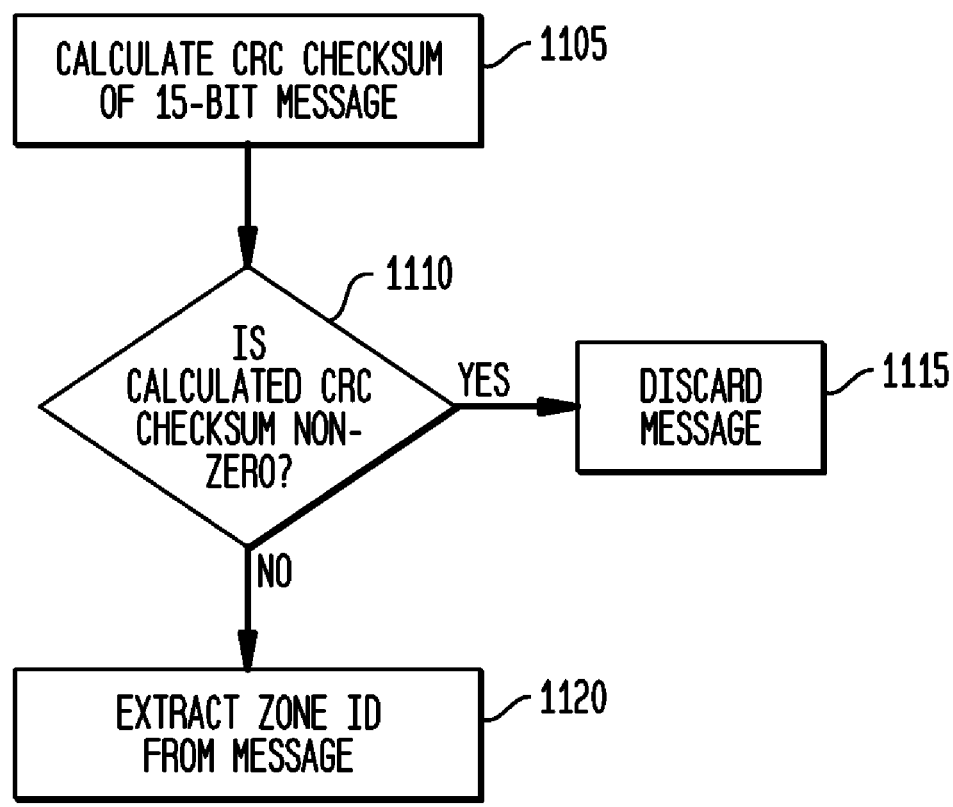
FIG. 11 is a flowchart of an exemplary method of determining the validity of a message using a CRC checksum.

FIG. 11 is a flowchart of an exemplary method of determining the validity of a message using a CRC checksum. This method may be followed by a programmable device that receives an ultrasound signal establishing a waypoint zone. The CRC checksum of the 15-bit message is calculated using methodology like that depicted in FIG. 10 (step 1105). If the calculated CRC checksum is 0 (step 1110), then the message is considered valid, i.e. without errors (step 1120). In this case, the zone ID is then extracted from the high 10 bits of the message and the low 5 bits are discarded (step 1120). However, if the calculated CRC checksum is not 0 (step 1110), then the message is considered invalid, i.e. with errors (step 1115). In this case, the message is discarded (step 1115).

While the exemplary embodiment can provide 1024 unique identifiers, a person of ordinary skill will recognize that more or fewer identifiers could be provided. For example, especially in situations where the system covers more than a single building, more than 1024 identifiers may be appropriate. In such a situation, larger numbers of identifiers can be generated, for example, by increasing the message length and/or increasing the number of bursts.

V. Interaction Criteria

As discussed above, upon recognizing a waypoint zone 150, the waypoint zone recognition component 140 of the programmable device 120 identifies the interaction criteria for the waypoint zone 150. The interaction criteria may be directions that should be given when in the waypoint zone 150. For example, a waypoint zone 150 may be provided for a stairwell. Thus, the interaction criteria for the waypoint zone 150 could be that the wearer is informed that he is at a stairwell and instructed to proceed up or down the stairs. In another example, a waypoint zone 150 could be provided for a certain room. Thus, the interaction criteria for the waypoint zone 150 could be that the user is informed of the room's number and told to enter the room. The interaction criteria may be configurable in allowing for any number of implementations, configurations, requirements, and/or permutations to serve a number of applications.

Figure 12:
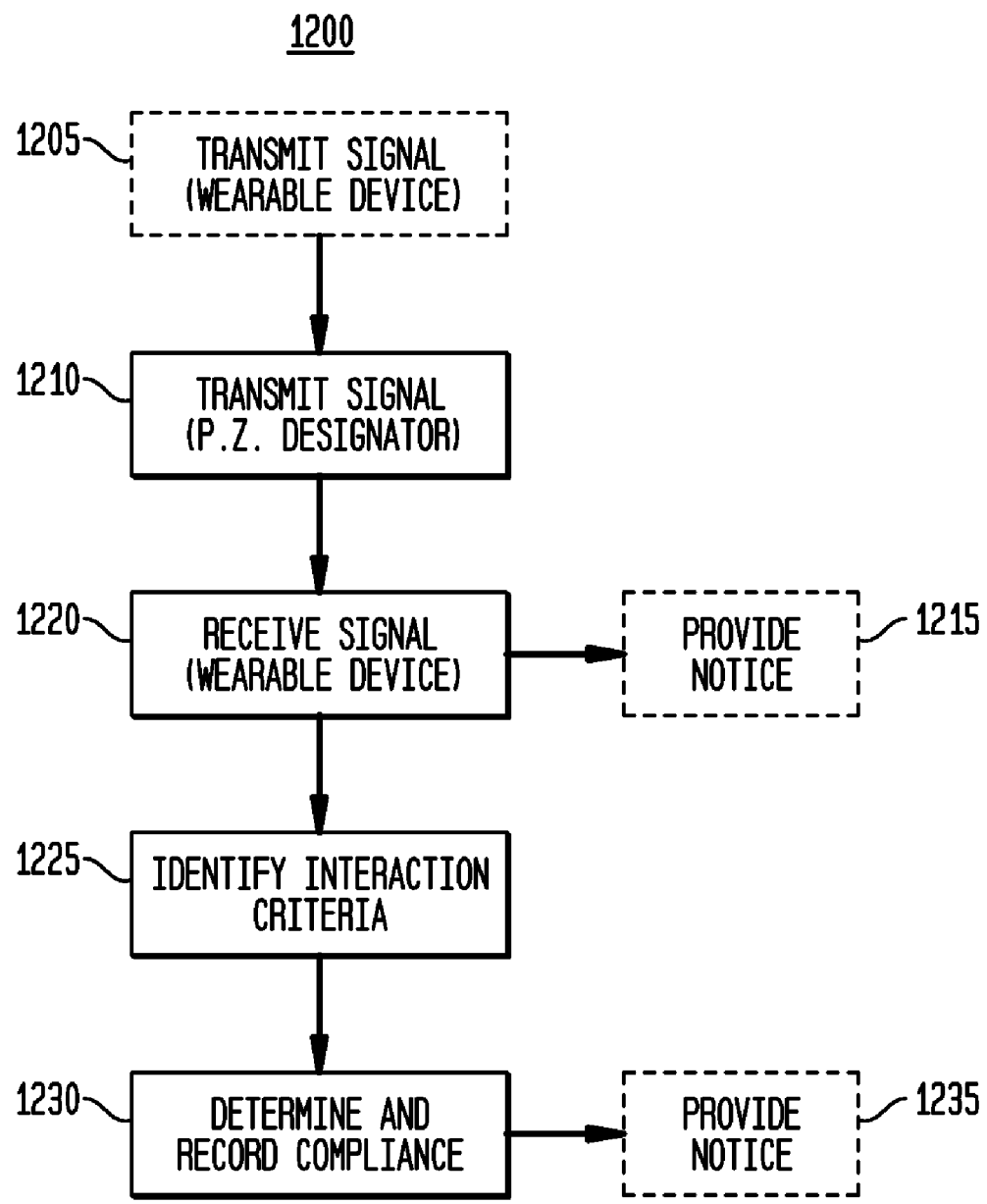
FIG. 12 is a flowchart of an exemplary method of for establishing a waypoint zone and monitoring interactions therewith.

FIG. 12 is a flowchart 1200 of an exemplary method of for establishing a waypoint zone and monitoring interactions therewith. For example, the depicted method can be implemented with the system depicted in FIG. 1. The method begins with the wayfinding beacon 110 transmitting a signal (step 1210). The transmission of the signal defines the waypoint zone 150. In certain embodiments, the signal is transmitted from the wayfinding beacon 110 in response to a signal from the programmable device 120 (step 1205). The programmable device 120 receives the signal when the programmable device 120 is within the waypoint zone 150 (step 1220). In certain embodiments, the programmable device 120 may provide notice that the waypoint zone 150 has been entered or that the programmable device 120 is within the waypoint zone 150 (step 1215). For example, a warning, such as an audible, visual, and/or tactile warning may be provided. Since the programmable device 120 is worn by the user, any such indications or warnings can be provided subtly and directly to the user without requiring additional infrastructure. Such subtle and direct indications or warnings to a particular user minimize alarm to all patients or customers present in the vicinity of the programmable device 120.

The waypoint zone recognition component 140 of the programmable device 120 then processes the received ultrasound signal to decode information encoded in the ultrasound signal. For example, the information may include the type and/or identity of the waypoint zone established by the ultrasound signal. The waypoint zone recognition component 140 identifies the interaction criteria for the waypoint zone based on the information encoded in the received ultrasound signal (step 1225). The waypoint zone recognition component 140 may then act in accordance with the interaction criteria by, for example, providing a directional prompt (e.g. by flashing a light or making a sound) or transmitting and/or receiving ultrasound signals to comply with the interaction criteria. The waypoint zone recognition component 140 of the programmable device 120 determines and records compliance with the identified interaction criteria (step 1230). In certain embodiments, the programmable device 120 may also provide notice of non-compliance (step 1235) by, for example, sounding an audible, visual, or tactile warning or alarm.

VI. Hospital Example for Guiding Visually Impaired Patients

For greater understanding of the concepts set forth herein, the following example of a system deployed in a specific facility for a specific purpose is provided. The example deployment is in a hospital and is purposed with guiding visually impaired patients through the building.

Figure 13:
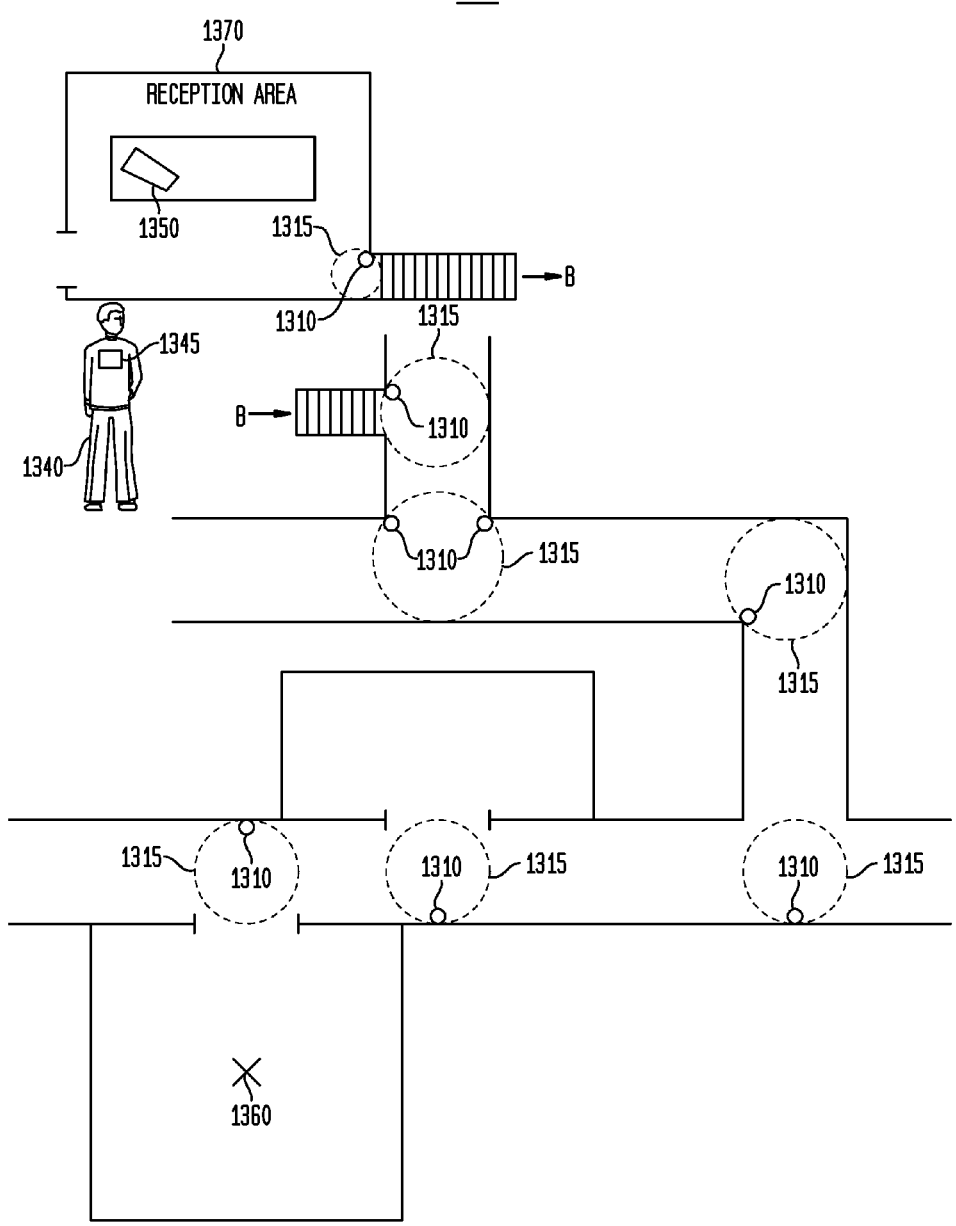
FIG. 13 depicts an exemplary embodiment of a system for providing wayfinding service in a hospital.

FIG. 13 depicts an exemplary embodiment of a system for guiding visually impaired patients in a hospital. However, it should be noted that the present invention is in no way limited to the specific example described herein. This example is merely provided for illustrative purposes.

In FIG. 13, the system 1300 has been deployed in a hospital environment. In this embodiment, the system 1300 includes multiple wayfinding beacons 1310 and a programmable device 1345. In this embodiment, the system 1300 further includes a base station 1350, and a destination room 1360.

In the present example, the wayfinding beacons 1310 are placed to provide waypoint zones 1315 in their immediate vicinity.

A visually impaired hospital patient 1340 wears the programmable device 1345. In the embodiment of FIG. 13, the patient 1340 enters the reception area 1370 of the hospital and checks in. The reception area 1370 also contains the base station 1350.

To assist the patient in getting from the reception area 1370 to his destination room 1360 a hospital technician programs the programmable device 1345 with the best route to the destination room 1360. Alternatively, the patient may simply select their destination using voice commands directly into the programmable device. The technician may also instruct the patient in using the programmable device 1345 and starts him on the route. The system 1300 is configured such that when the patient 1340 (wearing the programmable device 1345) enters a waypoint zone 1315, the programmable device 1345 receives an ultrasound signal from the wayfinding beacon 1310. The programmable device 1345 decodes identifying information from the ultrasound signal and compares it to the route information stored on the programmable device 1345. The programmable device 1345 then determines the next action necessary to keep the patient 1340 on route to their destination room 1360. The programmable device then gives a prompt to the patient 1340 to direct them along the route. As mentioned above, the prompt may be audible, visual, or tactile. In this case, a visual prompt may be used along with an audible or tactile prompt to alert others in the area of a patient 1340 who may be lost and need assistance. In other embodiments, such as a system for guiding hearing impaired patients through the hospital, the prompt may be primarily visual.

The programmable device 1345 may also record the actions of the patient 1340 for later analysis in order to improve hospital layout or route selection. Storing such data may also be necessary for insurance or liability purposes, should a patient get lost or intentionally enter unauthorized areas.

VII. Base Station

Another element of the system set forth in FIG. 13 is the optional base station 1350. In FIG. 13, the base station 1350 is located at the reception area 1370 near where patients enter the hospital. The base station 1350 is configured to communicate with programmable device 1345 for transferring data between the programmable device 1345 and the base station 1350. In this manner, data on the patient's location and path can be downloaded from the programmable device 1345 and route information can be uploaded to configure the programmable device 1345. The base station 1350 may also be configured to communicate with one or more of the wayfinding beacons 1310.

Figure 14:
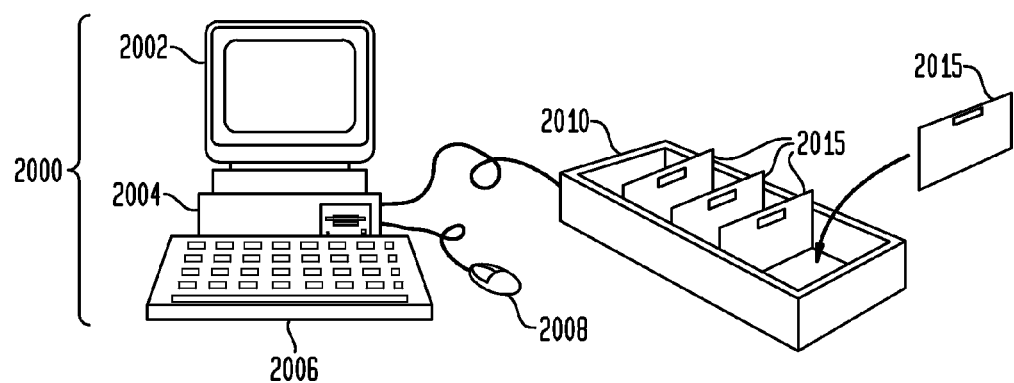
FIG. 14 depicts an exemplary embodiment of a base station.

FIG. 14 depicts an exemplary embodiment of a base station 1350. In this embodiment, the base station 1350 includes a workstation 2000 and a programmable device rack 2010. The workstation 2000 may include a terminal 2002, a computer, such as a personal computer 2004, and input devices, such as a keyboard 2006 and a mouse 2008. In other embodiments, the workstation may be a terminal 2002 connected to a remote or centrally located computer, such as a server. In other embodiments, the workstation 2000 may part of another system such as Electrical Medical Record (EMR) system.

The programmable device rack 2010 is connected to the workstation 2000. For example, the programmable device rack 2010 may be connected via a USB connection. The programmable device rack 2010 provides a convenient place to deposit one or more programmable devices 2015 allowing data to be transferred to and from the programmable device 2015 to the workstation 2000. The programmable device rack 2010 may include a number of slots or cradles for receiving the programmable devices 2015. As mentioned previously, programmable devices such as the badge 500 or badge holder 600 may be provided with ports, such as USB ports, for transferring data and charging the batteries of the programmable device 2015. Each slot or cradle of the programmable device rack 2010 may be provided with a USB plug to mate with the respective USB port of the programmable device 2015. Placing the programmable device 2015 into a slot or cradle connects the programmable device 2015 to the workstation 2000 for charging and data transfer. For example, at the end of their visit a hospital patient may return their programmable device 2015 and a staff member may place it in the cradle. This allows the programmable device to recharge while the route data recorded for the patient is downloaded to the workstation 2000 for storage and analysis. Alternatively, the data transfer communication may take place using a wireless communication technology. In one exemplary embodiment, the programmable device 2015 is configured to store data collected over one or more weeks so that the data stored on the programmable device 2015 need not be transferred to the workstation 2000 on a daily basis.

In accordance with some embodiments of the present invention, the base station 1350 does not include a programmable device rack 2010. Instead, the programmable device 2015 may communicate with the workstation 2000 of the base station 1350 directly using either a wired or wireless connection. In some such embodiments, the workstation 2000 may be located remotely or at a central location (such as a computer of data center) wherein the programmable device 2015 communicates wirelessly (using its internal transmitter and receiver or additional wireless technology) or via an Ethernet connection to the workstation 2000.

In exemplary embodiments, the base station 1350 may also be used to configure the programmable device 2015. For example, the route data used to guide the patient 1340 from the reception area 1370 to the destination room 1360 in FIG. 13 may be configured for the programmable device 1345 using the base station 1350. An example of this can be seen in FIG. 15.

The base station 1350 can encode a programmable device 2015 with directions to be provided in response to the reception of identifying signals from wayfinding beacons 110. These directions may be encoded only for the wayfinding beacons along the desired route, or directions to the desired destination may be provided for more, or even all wayfinding beacons so that if the wearer makes a wrong turn, the system may still guide the user to the correct destination. Such directions can be stored in the base station 1350—for example, in a database or other storage that stores directions to specific locations. Alternatively, route information to a particular destination can be calculated as needed, for example, using Here2There software provided by Global Software Applications, LLC of Philipsburg, Pa. In a further alternative, programmable devices 2015 can be encoded with a database of directions and/or wayfinding software for route calculation so that the programmable device only needs to be encoded with the desired destination in order to perform its intended functions.

As previously discussed, in some embodiments the base station 1350 of FIG. 13 may be configured to communicate wirelessly with one or more of the programmable devices 1345 and wayfinding beacons 1310. One advantage of such wireless communication is it allows for constant and continuous updates to the system. Thus, the waypoint zones and route data can be updated or modified as needed. Likewise, the status of programmable device 1345 and wayfinding beacons 1310 may also be continuously monitored.

As mentioned in the discussion of wayfinding beacon 110, the receiver 220 of the wayfinding beacon 110 may be used to receive signals for configuring the wayfinding beacon 110. As mentioned in the discussion of the programmable device 120, the receiver 400 of the programmable device 120 may be used to receive signals for configuring the programmable device 120. Likewise, the one or more transmitters 440 of the programmable device 120 may be used to transfer recorded route data.

Once data is obtained from the programmable device 1345 and wayfinding beacons 1310, it can be stored and analyzed. This data can be used to determine how well the guidance system is working. In the patient guidance example, hospital administrators can use the data to determine if their route selections are efficient or if their audible prompts need more detail. The data can also be cataloged and retained for insurance or liability purposes to show where a person travelled while in the building.

Figure 15:
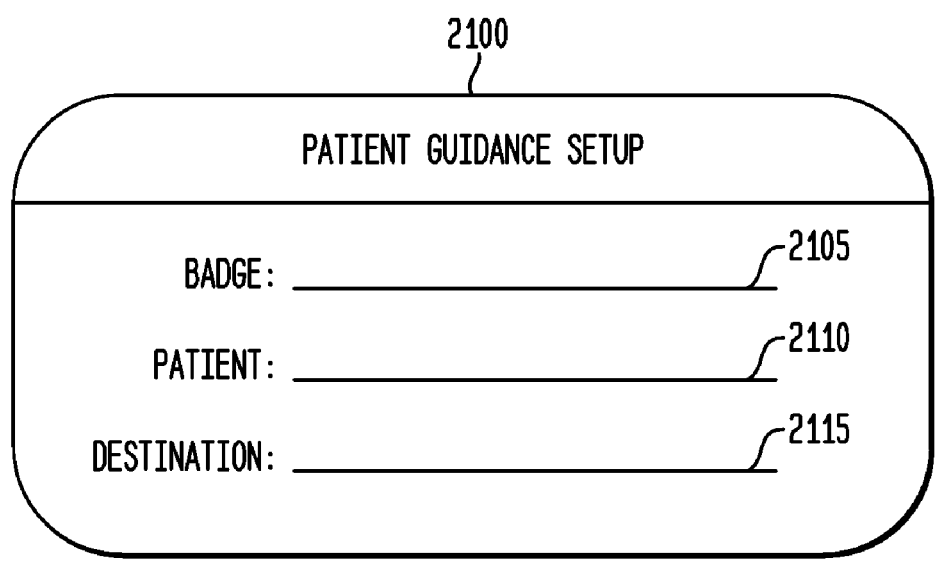
FIG. 15 depicts an exemplary embodiment of a graphical user interface provided by a base station.

FIG. 15 depicts an example graphical user interface (GUI) 2100 used to register the programmable device 2015 to associate a badge with a particular hospital patient. In this embodiment, the GUI provides a number of fields to be filled in by a user. The first field is the badge number field 2105. In the badge number field 2105, the user enters the identification number of the programmable device being configured. The next field is the patient field 2110. In the patient field 2110, the user enters the name of the hospital patient with whom the programmable device is to be associated. The next field is the destination field 2115. In destination field 2115, the user identifies the destination of the hospital patient associated with the programmable device. For example, the destination may be "exam room 403" or "x-ray department". Based on the information provided by the user, the programmable device 2015 may then be configured for the particular hospital patient.

It should be understood that the fields 2105, 2110, and 2115 depicted in FIG. 15 are but a few of a number of possible fields. In accordance with certain embodiments of the present invention, other fields may be provided depending on the information entered in previous fields. In other embodiments, the field may be provided to specify individually each interaction criteria.

VIII. Further Embodiment

A further embodiment of the invention 3000, using the features described above where applicable, is illustrated in FIG. 16. In this embodiment, a wayfinding beacon 110 in the form of an ultrasound transmitter is provided as described above. The programmable device in this embodiment consists of a mobile networking processor, such as cell phone 3200 combined with headset 3100. The programmable device communicates over a network to a base station—in this case, a Web server 3300 available over a network such as the Internet.

The headset 3100 includes a connector 3130 for connecting with the cell phone, although wireless connections such as Bluetooth, etc., could also be used. The headset 3100 further includes an ultrasound detector 3120 and a speaker or earpiece 3110.

Cell phone 3200 could be any type of "smart phone" that allows for custom programming such as, for example, cell phones that run the Android operating system available from Google, Inc. The cell phone can be programmed in the same manner as the programmable devices described above. In some embodiments, the ultrasound detector 3120 may also decode the ultrasound signal and pass location data along to the cell phone (for example, using DTMF tones), while in other embodiments, the ultrasound detector 3120 may pass raw data along to the cell phone for decoding. In addition, the cell phone may be programmed with route or map information, which may be obtained from the base station 3300 over a network, or may be programmed into the cell phone application which may be downloaded from a base station or other source for independent operation. In one embodiment, the cell phone can include wayfinding software such as described above, while obtaining map or location information for use with the software from a Web server over an internet or the Internet.

Headset 3100 may process voice as well as ultrasound signals. Where cell phone 3200 includes voice recognition software (such as the open source speech engine available from Google, Inc.), a user may speak the user's desired destination, cell phone 3200 will process that destination, determine an appropriate route, and commence audio directions for the user through speaker 3110 based upon location information received from one or more wayfinding beacons 110.

IX. Conclusion

Thus, the system and methodologies of the present invention provide an effective means to guide individuals through an unfamiliar indoor environment. A wayfinding beacon is placed at the location of a given waypoint. The wayfinding beacon transmits a signal that determines a waypoint zone. Individuals are provided with programmable devices that can receive the signal transmitted by the wayfinding beacon. When a programmable device is within the waypoint zone, the programmable device recognizes the waypoint zone and identifies the interaction criteria for the waypoint zone. The interaction criteria include directions based on the route of the user. The programmable device determines and records compliance with the interaction criteria. The recorded data may then be analyzed to determine the effectiveness of the guidance system or catalog the path of the patient when in the building.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention that, as a matter of language, might be said to fall there between.

The invention claimed is:

1. A wayfinding device for providing directions to a desired destination within a building having a plurality of wayfinding beacons configured to transmit data using an ultrasound signal, the ultrasound signal comprising a plurality of bursts, wherein a sequence of predefined time intervals between consecutive bursts within the plurality of bursts uniquely identifies each wayfinding beacon, comprising:
   a programmable device separate from the wayfinding beacons, the programmable device comprising a wayfinding beacon recognition component configured to identify a wayfinding beacon when the programmable device receives the data through the ultrasound signal from a wayfinding beacon;
   the programmable device being programmed to provide directions to a user of the programmable device in a direction toward the desired destination in response to identifying a wayfinding beacon.

2. The device of claim 1, wherein the programmable device includes an audio component and the directions provided to the user are audible.

3. The device of claim 2, wherein the programmable device includes a cell phone.

4. The device of claim 3, wherein the cell phone receives programming or location data from a server over a network.

5. The device of claim 4, wherein the programmable device provides spoken directions to the user through a speaker.

6. The device of claim 1, wherein the wayfinding beacon recognition component identifies wayfinding beacon transmissions of 7 bursts of the ultrasound signal and 8-10 carrier cycles per burst, each burst being a sequence of 6 pulses in which all time intervals between consecutive pulses are within a valid range.

7. The device of claim 6, wherein the valid range is between 23 and 27 microseconds, inclusive.

8. The device of claim 6, wherein the data in the transmitted signal is encoded in the predefined time intervals between consecutive bursts within the 7 bursts of the ultrasound signal.

9. The device of claim 6, wherein:
   each time interval between two consecutive bursts corresponds to an alphanumeric character of data; and
   a collection of all characters of the data encoded in the 7 bursts corresponds to the data on the wayfinding beacon.

10. The device of claim 6, wherein, for each burst of the ultrasound signal the wayfinding beacon recognition component is further configured to:
   recognize a single burst of ultrasound signal after receiving the 6 pulses in which all the time intervals between consecutive pulses are within a valid range; and
   minimize multipath interference of the ultrasound signal received at the waypoint zone recognition component by ignoring additional pulses received after recognizing the single burst for a blackout period.

11. The device of claim 10, wherein the blackout period is at least 30 milliseconds.

12. The device of claim 1, wherein the programmable device further comprises:
   a processor which processes a received ultrasound signal to decode the data encoded in the ultrasound signal; and
   a controller which controls the processor of the programmable device.

13. The device of claim 12, wherein the programmable device further comprises:
   a filter that filters out components of a received signal that do not correspond to an ultrasound signal, wherein the controller and processor are activated only when an ultrasound signal passes through and is output by the filter.

14. The device of claim 12, wherein the processor is coupled to memory that stores directional instructions for provision to the user upon receipt of wayfinding beacon identification data.

15. The device of claim 12, wherein the processor is programmed to calculate directional instructions for provision to the user upon receipt of wayfinding beacon identification data.

16. The device of claim 12, further comprising a base station having a work station for encoding the programmable device with the desired destination.

17. The device of claim 16, wherein the work station provides directional instructions for the desired destination and stores the directional instructions in a memory coupled to the processor on the programmable device.

18. The device of claim 1, wherein the data on the wayfinding beacon comprises:
   a zone identifier for the wayfinding beacon; and
   a CRC checksum that is used to determine if the zone identifier is valid.

19. The device of claim 1, further comprising a plurality of wayfinding beacons establishing a plurality of waypoint zones, each waypoint zone corresponding to one or more wayfinding beacons, the directions provided to the user being dependent upon the user being located within a waypoint zone.

20. A non-transitory computer-readable storage medium with an executable program stored thereon, wherein the program instructs a processor to perform the following steps:
   receive a desired destination to which a user wishes to go;
   obtain an ultrasound signal in the form of a series of bursts;
   decode the ultrasound signal to determine current location information;
   determine a direction for a user to proceed in so as to advance from the current location to the desired destination; and
   convey the direction to the user.

21. The medium of claim 20, where in the direction is audibly conveyed to the user.

22. The medium of claim 20, wherein the step of obtaining an ultrasound signal includes:
   recognizing a single burst of ultrasound signal after receiving a number of pulses in which all the time intervals between consecutive pulses are within a valid range; and
   minimizing multipath interference of the ultrasound signal received at the waypoint zone recognition component by ignoring additional pulses received after recognizing the single burst for a blackout period.

23. The medium of claim 20, wherein the step of decoding the ultrasound signal includes:
   recognizing a zone identifier indicating the location of a wayfinding beacon that transmitted the ultrasound signal; and
   evaluating a CRC checksum to determine whether the zone identifier is valid.

* * * * *

UNITED STATES PATENT AND TRADEMARK OFFICE
CERTIFICATE OF CORRECTION

| | |
|---|---|
| PATENT NO. | : 8,140,258 B1 |
| APPLICATION NO. | : 12/715544 |
| DATED | : March 20, 2012 |
| INVENTOR(S) | : Michael Dempsey |

It is certified that error appears in the above-identified patent and that said Letters Patent is hereby corrected as shown below:

Title page, item [73] Assignee:

"The General Hospital Corporation"

should read as follows:

"The General Hospital Corporation d/b/a Massachusetts General Hospital"

Signed and Sealed this
First Day of May, 2012

David J. Kappos
*Director of the United States Patent and Trademark Office*